United States Patent
Mino et al.

(10) Patent No.: US 9,899,835 B2
(45) Date of Patent: Feb. 20, 2018

(54) UNINTERRUPTIBLE POWER SUPPLY SYSTEM

(71) Applicant: FUJI ELECTRIC CO., LTD., Kawasaki-shi (JP)

(72) Inventors: Kazuaki Mino, Tokyo (JP); Ryuji Yamada, Tokyo (JP); Satoru Fujita, Tokyo (JP)

(73) Assignee: FUJI ELECTRIC CO., LTD., Kawasaki-shi (JP)

( * ) Notice: Subject to any disclaimer, the term of this patent is extended or adjusted under 35 U.S.C. 154(b) by 351 days.

(21) Appl. No.: 14/642,649

(22) Filed: Mar. 9, 2015

(65) Prior Publication Data

US 2015/0180232 A1    Jun. 25, 2015

(51) Int. Cl.
| | |
|---|---|
| *H02J 1/08* | (2006.01) |
| *H02J 1/10* | (2006.01) |
| *H02J 7/34* | (2006.01) |
| *H02J 7/35* | (2006.01) |
| *H02J 9/06* | (2006.01) |

(52) U.S. Cl.
CPC ............... *H02J 1/08* (2013.01); *H02J 1/102* (2013.01); *H02J 7/34* (2013.01); *H02J 7/345* (2013.01); *H02J 7/35* (2013.01); *H02J 9/062* (2013.01); *Y02B 10/72* (2013.01); *Y02E 10/766* (2013.01); *Y10T 307/344* (2015.04); *Y10T 307/625* (2015.04)

(58) Field of Classification Search
CPC ...... H02J 1/08; H02J 1/10; H02J 1/102; H02J 1/14; H02J 7/34; H02J 7/345; H02J 7/35; H02J 9/062; Y10T 307/344; Y10T 307/625; Y02B 10/72; Y02E 10/766
See application file for complete search history.

(56) References Cited

U.S. PATENT DOCUMENTS

| 5,616,968 A | 4/1997 | Fujii et al. |
| 7,589,436 B2 * | 9/2009 | Takahashi ................ G06F 1/30 |
| | | 307/112 |

(Continued)

FOREIGN PATENT DOCUMENTS

| JP | H07-184322 A | 7/1995 |
| JP | 2003-264939 A | 9/2003 |

(Continued)

OTHER PUBLICATIONS

Japan Radio Pamphlet "Fresh HVDC SED-2000 Series" Japan Radio Co., Ltd., May 2011.

(Continued)

*Primary Examiner* — Jung Kim
(74) *Attorney, Agent, or Firm* — Rabin & Berdo, P.C.

(57) ABSTRACT

Provided is an uninterruptible power supply system. The uninterruptible power supply system includes a power supply unit including a power supply circuit converting alternating current power into direct current voltage to be supplied to a load apparatus. The uninterruptible power supply system includes a battery unit including a battery circuit. The battery circuit stores direct current power and discharges the direct current power to generate direct current voltage to be supplied to the load apparatus. The uninterruptible power supply system includes a rack in which each of the power supply unit and the battery unit is mounted.

12 Claims, 14 Drawing Sheets

(56) References Cited

U.S. PATENT DOCUMENTS

| | | | |
|---|---|---|---|
| 8,860,252 B2* | 10/2014 | Kang | H02J 3/32 |
| | | | 307/46 |
| 9,306,418 B2* | 4/2016 | Yoshida | G06F 1/263 |
| 9,325,129 B2* | 4/2016 | Soneda | H01R 25/003 |
| 9,478,981 B2* | 10/2016 | Jung | H02J 3/32 |
| 2005/0121979 A1* | 6/2005 | Matsumoto | H01M 10/441 |
| | | | 307/66 |
| 2008/0012423 A1* | 1/2008 | Mimran | H01R 25/003 |
| | | | 307/11 |
| 2011/0133560 A1* | 6/2011 | Yamashita | G06F 1/30 |
| | | | 307/66 |
| 2012/0306271 A1 | 12/2012 | Kuriyama | |

FOREIGN PATENT DOCUMENTS

| | | | |
|---|---|---|---|
| JP | 2003-309935 A | 10/2003 |
| JP | 2005-124268 A | 5/2005 |
| JP | 2006-230029 A | 8/2006 |
| JP | 2011-125123 A | 6/2011 |
| JP | 2011-125124 A | 6/2011 |
| JP | 2012-143104 A | 7/2012 |
| JP | 2012-253940 A | 12/2012 |

OTHER PUBLICATIONS

Mark Murrill, "Evaluating the Opportunity for DC Power in Data Center", Emerson Network Power Energy System, pp. 1-10, 2010.

* cited by examiner

UNINTERRUPTIBLE POWER SUPPLY SYSTEM

This application is a continuation under 35 U.S.C. 120 of International Application PCT/JP2013/057560 having the International Filing Date of Mar. 15, 2013, which is fully incorporated herein by reference.

TECHNICAL FIELD

The present invention relates to an uninterruptible power supply system such that a power supply system that supplies power to a plurality of servers (load apparatus), installed in, for example, a data center and configuring a multinode server, can be constructed with economy of space.

BACKGROUND ART

FIG. 12 shows a schematic configuration diagram of an existing general power supply system in a data center including a plurality of load apparatus, for example, a plurality of servers, having direct current voltage as a drive power supply. The power supply system includes an uninterruptible power supply system (UPS) 1 installed in a 400V system power supply, and an alternating current power distributor (PDU) 2 that converts high-voltage alternating current power (400V AC) supplied via the uninterruptible power supply system 1 into alternating current power of, for example, 200V or 100V.

Herein, the uninterruptible power supply system 1 basically includes a large capacity battery (BAT) 1a in which direct current power can be stored. Also, the uninterruptible power supply system 1 is configured to include an AC/DC converter 1b that converts the high-voltage alternating current power into direct current voltage, thus charging the battery 1a, and a DC/AC converter 1c that converts an output voltage of the AC/DC converter 1b or direct current power stored in the battery 1a into high-voltage alternating current power, and outputs the high-voltage alternating current power.

Herein, the power distributor 2 includes a breaker 2a that separates, for example, the system power supply and a load equipment side including the load apparatus (servers). Also, the alternating current power distributor 2 further includes a transformer 2b that converts the high-voltage alternating current power (400V AC) into alternating current power of, for example, 200V, and outputs the converted alternating current power. Reference sign 3 in the drawing is a transformer that converts transmitted alternating current power of, for example, 6.6 kV into the high-voltage alternating current power (400V AC), and draws the high-voltage alternating current power into a building in which the uninterruptible power supply system 1 and the like are provided.

Also, load equipment constructed to include a plurality of a server 4 as the load apparatus includes a switching power supply 5, connected to the power distributor 2 at the stage previous thereto, that generates low-voltage direct current voltage of 48V or less (for example, 12V DC), which is drive power supply voltage of the server 4, from the alternating current voltage (200V AC). The switching power supply 5 generally includes an AC/DC converter 5a that converts the alternating current voltage (200V AC) into direct current voltage, and a DC/DC converter 5b that converts the output voltage of the AC/DC converter 5a into direct current output voltage (12V DC) to be supplied to the server 4. Further, each of the plurality of the server 4 is connected to the switching power supply 5, and operates by the direct current output voltage, which is the drive power supply of the server 4, being supplied from the switching power supply 5 (for example, refer to PTL 1).

The plurality of the server 4 are generally installed housed in server racks to form server groups of a predetermined number each, and the switching power supply 5 is provided corresponding to each server group. Further, the switching power supply 5 is housed integrally with the predetermined number of the server 4 in the server rack. The plurality of the server 4 construct a so-called multinode server.

However, the existing general power supply system configured as heretofore described has a large number of conversion stages, such as the previously described AC/DC converters 1b and 5a and DC/DC converter 5b, and conversion efficiency with respect to power is poor. Therefore, power supply systems such that the kinds of direct current power supply system shown in FIG. 13 and FIG. 14 are constructed have been proposed.

The power supply system shown in FIG. 13 is such that high-voltage direct current voltage (400V DC) obtained from the AC/DC converter 1b of the uninterruptible power supply system 1 is supplied directly to a direct current power distributor 2. Further, the load apparatus side is configured so that the high-voltage direct current voltage supplied via the power distributor tis input into the switching power supply 5 formed of a DC/DC converter 5d, and direct current output voltage (12V DC) to be supplied to the server 4 is generated by the switching power supply 5 (DC/DC converter 5d). This kind of power supply system is called, for example, a high-voltage direct current power supply system (HVDC) (for example, refer to NPL 1).

Also, the power supply system shown in FIG. 14 is such that high-voltage direct current power (400V DC) obtained from the AC/DC converter 1b of the uninterruptible power supply system 1 is converted into low-voltage direct current voltage (48V DC) via a DC/DC converter 1d provided in the uninterruptible power supply system 1, and supplied to the direct current power distributor 2. Further, the load apparatus side is configured so that direct current low voltage supplied from the power distributor 2 is input into the switching power supply 5 formed of a DC/DC converter 5e, and direct current output voltage (12V DC) to be supplied to the server 4 is generated by the switching power supply 5 (DC/DC converter 5e). This kind of power supply system is called, for example, a low-voltage direct current power supply system (for example, refer to NPL 2).

As technology relating to the uninterruptible power supply system 1 in the heretofore described power supply systems, it is disclosed in, for example, PTL 2 that uninterruptible power supply systems are operated in parallel. Also, it is disclosed in PTL 3 that when increasing the number of uninterruptible power supply systems operated in parallel, only the batteries are connected in parallel by switching, because of which the battery capacities are changed.

CITATION LIST

Patent Literature

PTL 1: JP-A-2012-143104
PTL 2: JP-A-7-184322
PTL 3: JP-A-2006-230029

Non Patent Literature

NPL 1: Japan Radio Pamphlet "FRESH HVDC SED-2000 Series" Japan Radio Co., Ltd., May, 2011

NPL 2: Mark Murrill and B.J. Sonnenberg "Evaluating the Opportunity for DC Power in Data Center" 2010 Emerson Network Power Energy Systems, North America, Inc.

SUMMARY OF INVENTION

Technical Problem

However, the high-voltage direct current power supply system shown in FIG. 13 is such that a large breaker is needed as the breaker 2a in the power distributor 2 when interrupting high-voltage direct current power. That is, interruption of a direct current of high voltage or large size using a mechanical contact breaker is generally difficult, because of which the breaker 2a is considerably bigger than a mechanical contact breaker that interrupts an alternating current of the same voltage or current rating. Therefore, the breaker 2a is a cause of an increase in equipment cost. Moreover, in order to draw the high-voltage direct current power into the server rack, which has a high maintenance frequency, anti-electrocution measures against the direct current voltage (400V DC) are also necessary.

Regarding this point, the direct current power supply system shown in FIG. 14 is such that, as the voltage of the direct current power drawn into the server rack is low at 48V DC, there is little effect of electrocution with respect to the direct current voltage (48V). However, as low-voltage large direct current is handled in this direct current power supply system, consideration needs to be given to reducing loss and heat generation in conductors such as wiring. Furthermore, with regard to the previously described breaker 2a too, a large breaker that can respond to a large current is necessary. Because of this, it is undeniable that this will lead to an increase in equipment cost.

Also, large uninterruptible power supply systems 1 with a high capacity of several hundred kilowatts or more are normally disposed concentrated in the data center, and installed in a system power supply, as previously described. Because of this, the space needed for the installation of the uninterruptible power supply systems 1 occupies a large proportion of the data center. Also, it is undeniable that the effect when a failure occurs in the uninterruptible power supply system 1 spreads to all of the servers (load apparatus) 4, which also causes a decrease in reliability. Also, the technology disclosed in each of PTL 2 and 3 is such that it is necessary to use a plurality of uninterruptible power supply systems in parallel in order to connect the batteries in parallel and increase the capacities thereof, because of which there is a problem in that the system configuration is large-scale.

The invention, having been contrived considering this kind of situation, has an object of providing an uninterruptible power supply system such that it is possible to easily construct a power supply system that supplies power to load apparatus formed of, for example, a plurality of servers, with economy of space, compactly, and moreover, in accordance with the required power capacity.

Solution to Problem

In order to achieve the heretofore described object, an uninterruptible power supply system according to the invention is characterized by including a power supply unit wherein a power supply circuit portion that converts alternating current power, thus generating direct current voltage to be supplied to a load apparatus, is housed in a frame of predetermined dimensions, a battery unit wherein a battery circuit portion, provided aligned with the power supply unit, that stores direct current power and causes the stored direct current power to be discharged, thus generating direct current voltage to be supplied to the load apparatus, is housed in a frame of the same dimensions as the frame of the power supply unit, and a rack, in which each of the power supply unit and battery unit is mounted so as to be connectable and detachable, that connects the power supply circuit portion of the power supply unit and the battery circuit portion of the battery unit in parallel.

Preferably, the rack is configured to include a connecting structure body on which each of the power supply unit and battery unit is mounted from the front surface side of the rack so as to be connectable and detachable, and which is coupled to the power supply circuit portion and battery circuit portion via a connector provided on the frame of each of the power supply unit and battery unit at the back surface side of the rack, thus connecting the power supply unit and battery unit in parallel.

Herein, the connecting structure body is formed of an alternating current power supply line connected to a system power supply, and a direct current power line that supplies direct current voltage to a load apparatus. Also, the battery unit is connected in parallel to the power supply unit via the direct current power line, and the battery circuit portion is configured to include a DC/DC converter that takes in direct current voltage output from the power supply unit, stores direct current power in a battery, and generates direct current voltage to be supplied to the load apparatus from the direct current power stored in the battery.

Preferably, the connector is formed of one of a plug and plug socket that form a plug-in type pair coupled in accompaniment to a mounting of the power supply unit or battery unit in the rack, and disengaged in accompaniment to a removal of the power supply unit or battery unit from the rack, and the connecting structure body is configured to include the other of the plug and plug socket.

Preferably still, the connecting structure body is provided straddling a plurality of housing regions of the rack in which the power supply unit or battery unit is selectively mounted. Also, it is desirable that a terminal portion that separates the direct current power line between neighboring housing regions is provided in the connecting structure body, and realized as a linking structure that connects the direct current power line in parallel or in series via a terminal unit mounted in the terminal portion.

It is also preferred that a DC/AC converter that generates alternating current power to be supplied to the power supply unit from direct current power stored in the battery, and outputs the alternating current power to the alternating current power supply line, is provided in the battery circuit portion. Furthermore, it is also desirable that a converter, connected to a power supply input system provided separately from the alternating current power supply line, that converts the voltage of power obtained from a photovoltaic generation device or wind power generation device via the power supply input system, and stores the power in the battery, is provided in the battery circuit portion.

Preferably, when the rack has dimensions compliant with Electronic Industries Alliance ("EIA") standards such that a plurality of load apparatus can be mounted aligned vertically, the frames of predetermined dimensions in which the power supply unit and battery unit are individually housed are realized as frames having a basic housing size of the rack, or a size such that the basic housing size is divided in the width direction into N equal portions (N is a positive integer of 2 or more). Further, it is desirable that the power supply unit and battery unit are mounted in the rack together with a predetermined number of the load apparatus.

The power supply unit is provided separately for each phase of a three-phase alternating current power supply. Also, a plurality of the battery unit may be provided in parallel with one power supply unit.

Also, it is desirable that a fan device that causes air to flow through the interior of each frame, thereby releasing heat in the power supply circuit portion and battery circuit portion is provided in each of the power supply unit and battery unit, and the fan devices are driven even when operation of the power supply circuit portion and battery circuit portion is stopped.

Advantageous Effects of Invention

According to the uninterruptible power supply system with the heretofore described configuration, a power supply unit and battery unit are configured separately, and a power supply circuit portion and battery circuit portion are simply connected in parallel by the power supply unit and battery unit each being housed in a rack, because of which a power supply system with excellent expandability, and in accordance with load specifications, can easily be constructed. Moreover, the number of battery units connected in parallel to the power supply unit can easily be increased, and increasing the power capacity thereof is also easy.

Also, the power supply unit and battery unit configuring the uninterruptible power supply system can be installed utilizing empty space in a rack that houses, for example, a plurality of load apparatuses (servers). Consequently, there is no need to secure dedicated space in a data center for installing the uninterruptible power supply system, as is the case with the existing power supply system wherein high-capacity uninterruptible power supply systems are disposed concentrated in a system power supply, and it is thus possible to construct the power supply system compactly. Furthermore, the power supply circuit portion and battery circuit portion are individually housed in frames of the same dimensions, thus configuring the power supply unit and battery unit respectively, because of which the power supply unit and battery unit can each be constructed at low cost as a unit having a predetermined power capacity. Consequently, it is possible to construct at low cost overall as an uninterruptible power supply system too.

Also, by operating the battery unit between a plurality of uninterruptible power supply systems in accordance with, for example, load status, it is also possible to increase the conversion efficiency of the power supply unit, compensate for a drop in the amount of alternating current power, and the like. Furthermore, as it is also possible to replace the power supply unit and battery unit individually, and to carry out maintenance individually, there are also advantages such as maintenance management of the power supply unit and battery unit being easy. Therefore, according to the invention, it is possible to provide an uninterruptible power supply system such that it is possible to achieve advantages in that increased efficiency and economy of space are achieved for the whole of a power supply system, it is possible to suppress equipment cost for the power supply system, and the like.

DESCRIPTION OF EMBODIMENTS

Figure 1:
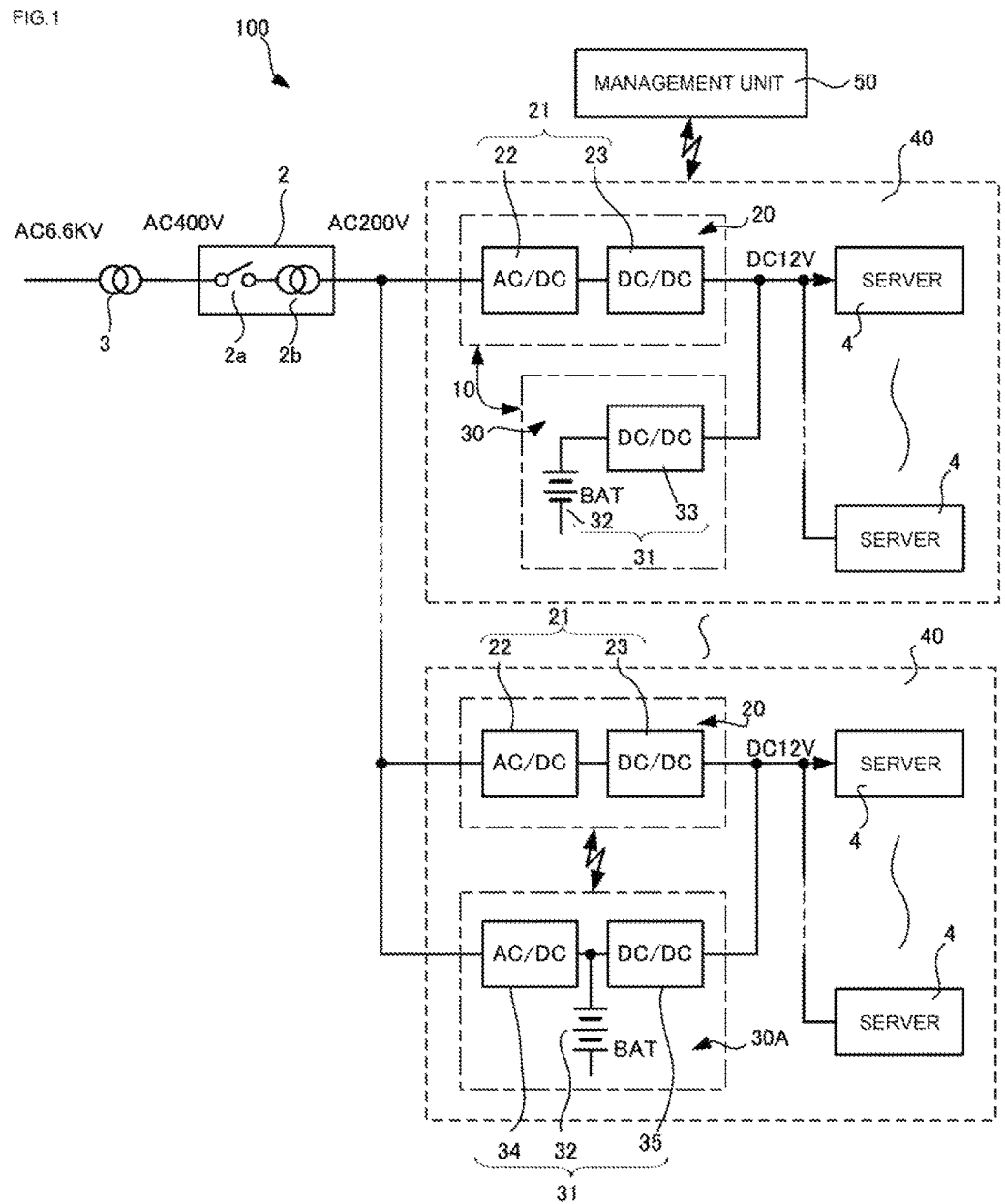
FIG. 1 is a schematic configuration diagram of a power supply system constructed to include an uninterruptible power supply system according to an embodiment of the invention.

Hereafter, referring to the drawings, a description will be given of an uninterruptible power supply system according to an embodiment of the invention.

FIG. 1 is a schematic configuration diagram of a power supply system 100 constructed using the uninterruptible power supply system according to the embodiment. The power supply system 100 is suitable for supplying 12V direct current voltage, which is a drive source of a server 4, to each of a plurality of the server (load apparatus) 4 provided in, for example, a data center and constructing a multinode server. In FIG. 1, the same reference signs are given to portions the same as in the existing power supply system.

The power supply system 100, including an alternating current power distribution unit (PDU) 2 connected to a 400V system power supply, is configured so as to supply the alternating current power via the power distribution unit 2 to a server rack 40 in which are housed a plurality of the server (load apparatus) 4. The power supply system 100 shown in FIG. 1, incorporating a transformer 2*b* in the power distribution unit 2, is configured so as to convert high voltage alternating current voltage (400V AC) supplied from the system power supply into 200V alternating current power, and supply the 200V alternating current voltage to the load side (server rack 40). The power supply system 100 can also, of course, be configured so as to supply the alternating current voltage (400V AC) as it is to the load side via the power distribution unit 2.

Herein, an uninterruptible power supply system 10 configured of a power supply unit 20 and battery unit 30 is provided in the server rack 40 in which are housed a plurality of the server (load apparatus) 4, corresponding to each of server groups formed of a predetermined number of the server 4. The power supply unit 20 is configured to house a power supply circuit portion 21 (which may also be referred to as a power supply circuit) forming a main body thereof in a frame of predetermined dimensions that can be mounted in the server rack 40.

Herein, the power supply circuit portion 21 includes an AC/DC converter 22 that converts the alternating current voltage (200V AC/400V AC) into direct current voltage. Furthermore, the power supply circuit portion 21 includes a DC/DC converter 23 that converts the output voltage of the AC/DC converter 22 into direct current voltage (12V DC) to be supplied to the server 4. The power supply circuit portion 21 corresponds to the switching power supply 5 shown in FIG. 12. Consequently, the AC/DC converter 22 and DC/DC converter 23 configuring the power supply circuit portion 21 correspond respectively to the AC/DC converter 5a and DC/DC converter 5b in the switching power supply 5.

The battery unit 30 is configured to house a battery circuit portion 31 (which may also be referred to as a battery circuit) forming a main body thereof in a frame of the same dimensions as those of the frame of the power supply unit 20. The battery unit 30 is provided aligned with the power supply unit 20, and is driven in parallel with the power supply unit 20. Herein, the battery unit 30 (battery circuit portion 31) has a role of storing direct current power when the power supply unit 20 (power supply circuit portion 21) operates, and releasing the stored direct current power, thus making the direct current power available for the generation of the direct current voltage (12V DC). Consequently, the uninterruptible power supply system 10 constructed to include the power supply unit 20 and battery unit 30 in parallel, unlike the uninterruptible power supply system 1, constructs a direct current output type of uninterruptible power supply system that includes a power supply function with respect to the server (load apparatus) 4.

Herein, the battery circuit portion 31 includes a battery 32, such as a Li-ion battery, that can store direct current power. Furthermore, the battery circuit portion 31 is connected to a voltage output terminal of the DC/DC converter 23, as shown in FIG. 1, and is configured to include a bidirectional DC/DC converter 33 that selectively charges and discharges the battery 32. In this case, the bidirectional DC/DC converter 33 receives the 12V direct current voltage and charges the battery 32, whereby direct current power is stored. Also, the bidirectional DC/DC converter 33 generates the 12V direct current voltage to be supplied to the server (load apparatus) 4 from the direct current power stored in the battery 32, and outputs the 12V direct current voltage.

As shown as a battery unit 30A in FIG. 1, the battery circuit portion 31 can also be configured so as to charge the battery 32 using an AC/DC converter 34 that converts the alternating current voltage (200V AC/400V AC) into direct current voltage. In this case, instead of the bidirectional DC/DC converter 33, it is sufficient to use a DC/DC converter 35 that includes only the function of generating the 12V direct current voltage to be supplied to the server (load apparatus) 4 from the direct current power stored in the battery 32.

Whichever configuration is employed for the battery circuit portion 31, the battery unit 30 is provided in parallel with the power supply unit 20, and is provided so as to be able to operate simultaneously with the power supply unit 20. Herein, "able to operate simultaneously" not only means charging the battery 32 when the power supply unit 20 operates, but also means discharging the direct current power stored in the battery 32 when the power supply unit 20 operates, thereby generating the direct current voltage (12V DC), as will be described hereafter.

Herein, the AC/DC converters 22 and 34 have a role of converting, for example, high-voltage alternating current voltage (400V AC) into a predetermined direct current voltage (800V DC), as previously described. Herein, when constructing the AC/DC converters 22 and 34 using a general two-level power converter circuit, it is normally required that a semiconductor switching element (for example, a MOSFET, IGBT, or the like) thereof includes breakdown voltage characteristics of 1,000V or more. Consequently, it is desirable that the AC/DC converters 22 and 34 are configured using, for example, a neutral-point-clamped three-level power converter circuit.

This kind of neutral-point-clamped three-level power converter circuit is as introduced in detail in, for example, JP-A-2012-253981 and JP-A-2011-223867. Further, according to the neutral-point-clamped three-level power converter circuit, it is possible to suppress the voltage applied to the semiconductor switching element to approximately one-half of the input voltage thereof.

Consequently, it is possible to construct each of the AC/DC converters 22 and 34 compactly using a comparatively low-cost semiconductor switching element with excellent performance and breakdown voltage of in the region of 600V. Moreover, it is possible to suppress loss in the semiconductor switching element, thereby also increasing the power conversion efficiency itself of the semiconductor switching element. Therefore, as well as it being possible to reduce the size and weight of the battery 32 by using, for example, a small, high-capacity Li-ion battery or the like, the power supply circuit portion 21, including the DC/DC converter 23 and the like, and battery circuit portion 31 can each be configured compactly.

The power supply unit 20 and battery unit 30 configured as heretofore described, as shown in, for example, FIG. 2, are each housed so as to be connectable to and detachable from the server rack 40, in which a plurality of the server (load apparatus) 4 can be mounted aligned vertically and which has dimensions compliant with EIA standards. Herein, the frame that houses the power supply circuit portion 21, thus constructing the power supply unit 20, is formed of a frame that is of a basic housing size of the server rack 40, and in particular, of a size such that the basic housing size is divided in the width direction into N equal portions (N is a positive integer of 2 or more). Specifically, the frame is formed of a one-quarter size (abbreviated here as a 1U4 size) frame wherein a so-called one unit size (1U size) is divided in the width direction into 4 equal portions. Also, the frame that houses the battery circuit portion 31, thus constructing the battery unit 30, is also formed of a 1U4 size frame of the same dimensions as that of the power supply unit 20.

Figure 2A:
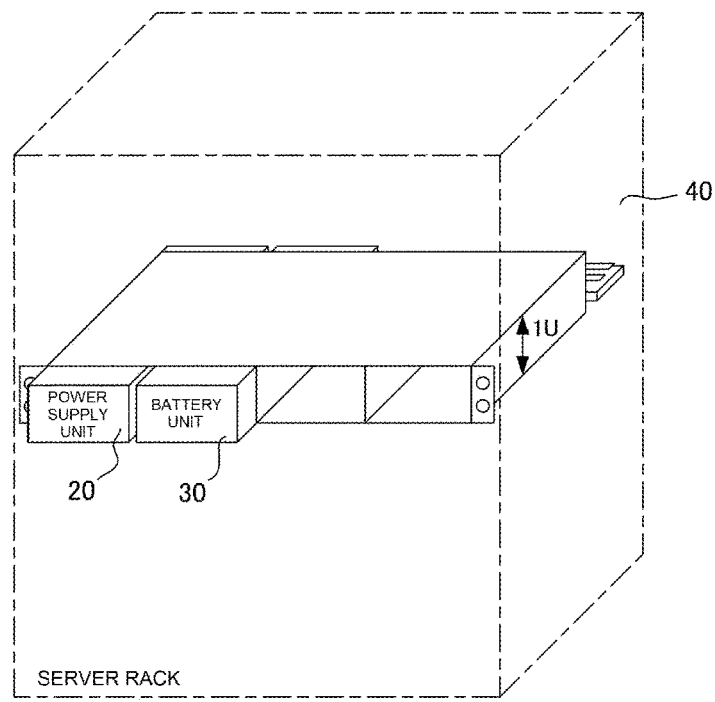
FIGS. 2A and 2B are diagrams are diagrams showing an example of an aspect of the uninterruptible power supply system shown in FIG. 1 mounted in a server rack.
Figure 2B:
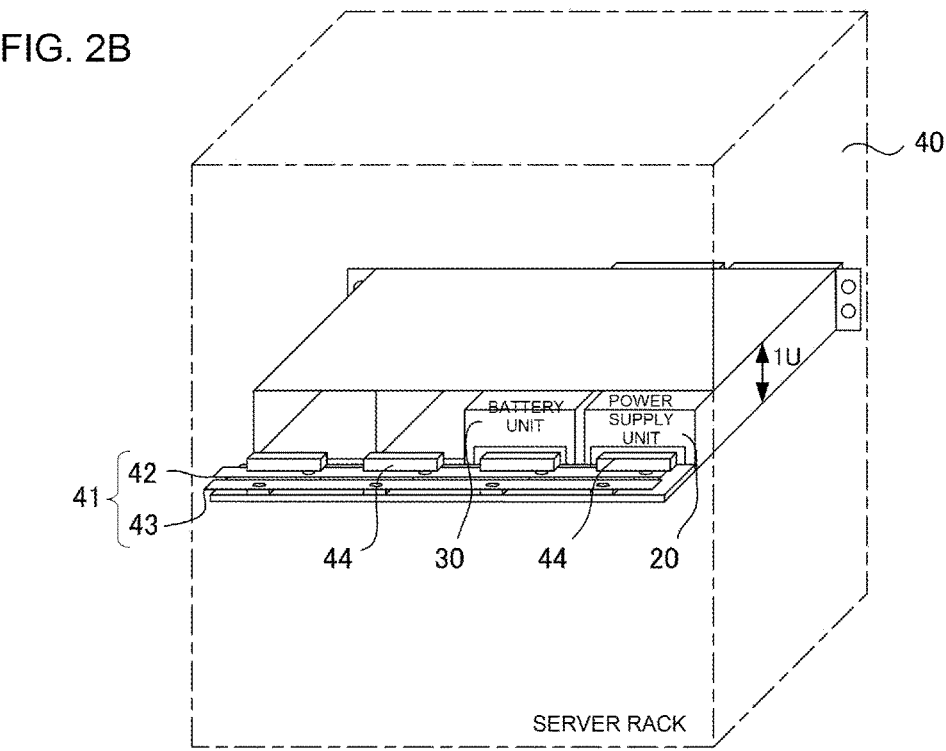

Further, the power supply unit 20 and battery unit 30 are housed aligned in the server rack 40, as shown in each of FIG. 2A, showing a state wherein the server rack 40 is seen from the front side (head-on), and FIG. 2B, showing a state wherein the server rack 40 is seen from the back side (behind). In particular, the power supply unit 20 and battery unit 30 are each mounted from the front side of the server rack 40 so as to be connectable to and detachable from the server rack 40.

Herein, a connecting structure body 41 that connects the power supply unit 20 and battery unit 30 in parallel is provided on the back side of the server rack 40, as shown in FIG. 2 B. The connecting structure body 41 basically includes an alternating current power supply line 42, connected to the system power supply, that supplies alternating current voltage (200V AC/400V AC), and a direct current power line 43 that supplies direct current voltage (12V DC) to the server (load apparatus). The connecting structure body 41 is linked to each of the power supply unit 20 and battery unit 30 via a connector to be described hereafter.

Herein, a connector 44 provided on the back side of the frame of each of the power supply unit 20 and battery unit 30 is formed of one of a plug and plug socket forming a plug-in type pair. Also, the other of the plug and plug socket is provided in the connecting structure body 41. The connector 44 forming the plug-in type pair is coupled in accompaniment to a mounting of the power supply unit 20 and battery unit 30 in the server rack 40, while the coupling is released in accompaniment to a removal of the power supply unit 20 and battery unit 30 from the server rack 40.

Further, the connector 44 connects the power supply circuit portion 21 and battery circuit portion 31 to the alternating current power supply line 42 and direct current power line 43, by doing which the connector 44 performs a role of connecting the power supply unit 20 and battery unit 30 in parallel. When the battery circuit portion 31 is configured so as to take in direct current voltage (12V DC) output from the power supply circuit portion 21 and charge the battery 32, as previously described, the connector 44 provided in the battery unit 30 connects the battery circuit portion 31 only to the direct current power line 43.

An example in a case wherein single-phase alternating current power (200V AC) is input is shown in FIGS. 2A and 2B, but when three-phase alternating current power is input, the power supply unit 20 is provided individually for each phase (R, S, and T) of the three-phase alternating current power supply. Further, the battery unit 30 is provided for each of the power supply units 20. In this case, as shown in, for example, FIGS. 3A and 3B, the power supply unit 20 and battery unit 30 corresponding to each phase (R, S, and T) are housed aligned horizontally, using two rows of housing shelf of the server rack 40 neighboring in a vertical direction.

Figure 3A:
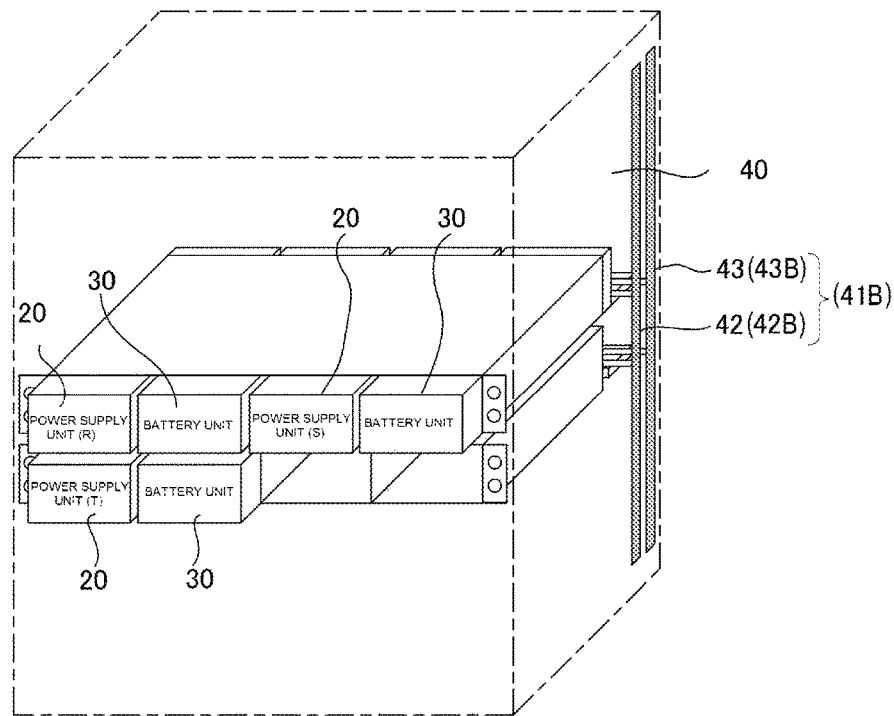
FIGS. 3A and 3B are diagrams showing an example of an aspect of the uninterruptible power supply system mounted in the server rack when three-phase alternating current power is input.
Figure 3B:
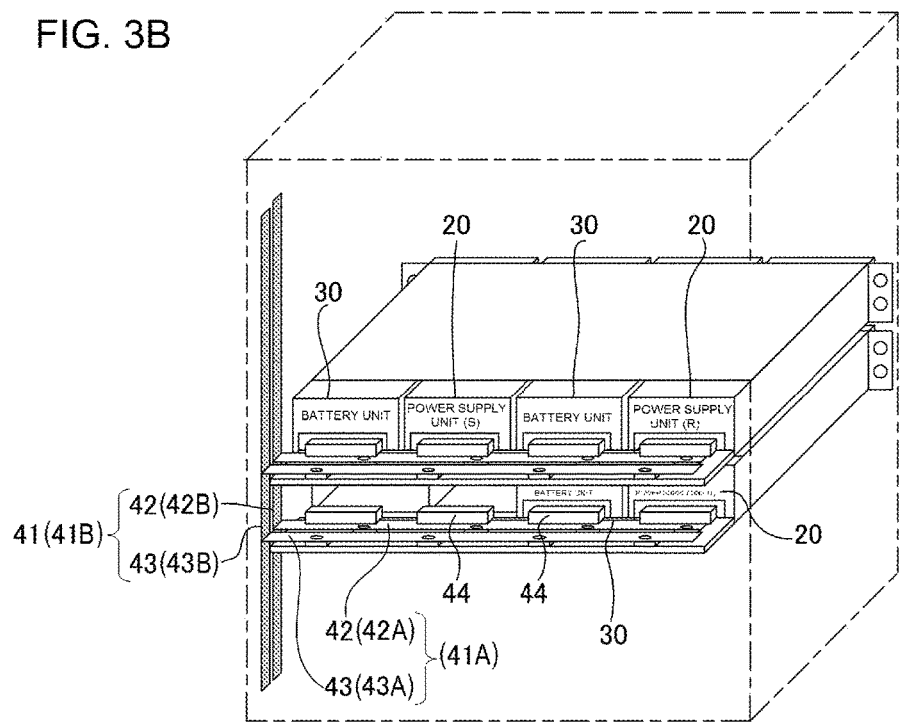

At this time, the connecting structure body 41 has a configuration such that the alternating current power supply line 42 and direct current power line 43 are extended to straddle a plurality of housing shelves of the server rack 40 aligned in a vertical direction, as shown in FIGS. 3A and 3B. It is sufficient that the alternating current power supply line 42 and direct current power line 43 (43A, 43B) extended in a vertical direction are provided along a strut provided on a side portion on the back side of the server rack 40. Also, although omitted from the drawings here, it goes without saying that the connecting structure body 41 (41A, 41B) is also provided extended on other housing shelves of the server rack 40 that house the server (load apparatus) 4. The connecting structure bodies 41A may correspond to first connecting structure body. Further, supply of direct current voltage (12V DC) to the server (load apparatus) 4 is carried out via the direct current power line 43 (43A, 43B) of the connecting structure body 41 (41A, 41B).

Figure 4A:
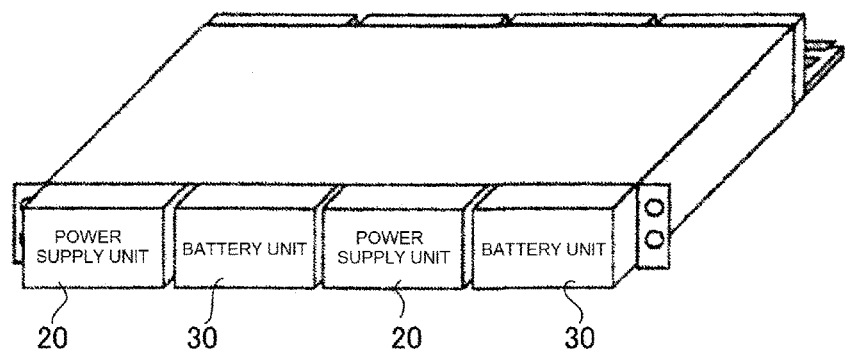
FIGS. 4A, 4B and 4C are diagrams showing an expansion example of the uninterruptible power supply system when single-phase alternating current is input.
Figure 4B:
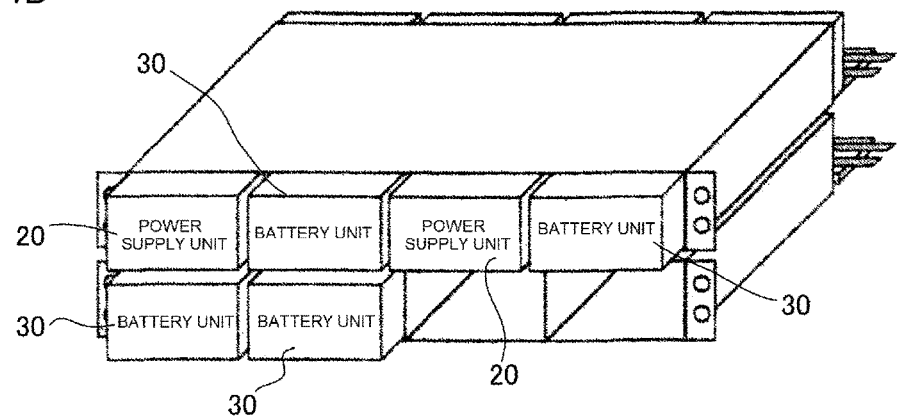
Figure 4C:
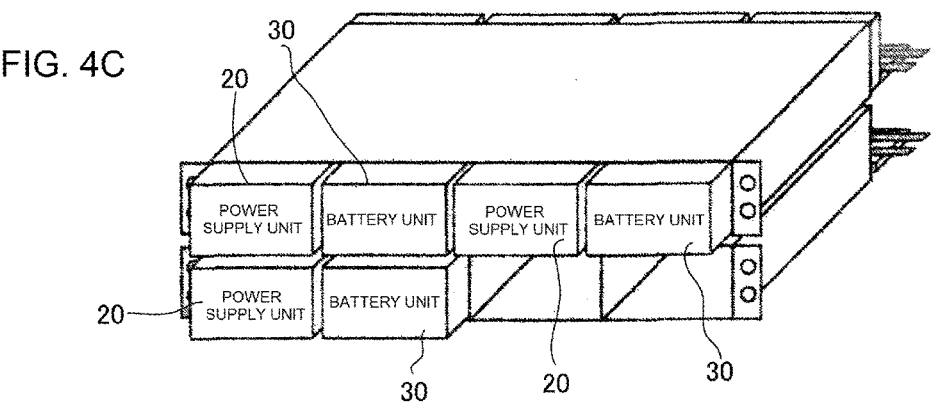

Herein, a simple description will be given of an expanded aspect of the uninterruptible power supply system 10. In the case of a single-phase input of the alternating current power supply, each of the power supply unit 20 and battery unit 30 is realized in 1U4 size, as previously described, because of which it is basically sufficient that two of the power supply unit 20 and two of the battery unit 30 are used, and housed aligned horizontally on one housing shelf of the server rack 40, as shown in FIG. 4A. Also, when increasing battery capacity, it is sufficient that the number of the battery unit 30 is increased, and housed on a housing shelf neighboring the power supply unit 20, as shown in, for example, FIG. 4B. Furthermore, when increasing the power supply capacity itself with respect to the server (load apparatus) 4, it is sufficient that the number of the battery unit 30 is increased together with that of the power supply unit 20, as shown in, for example, FIG. 4C.

Figure 5A:
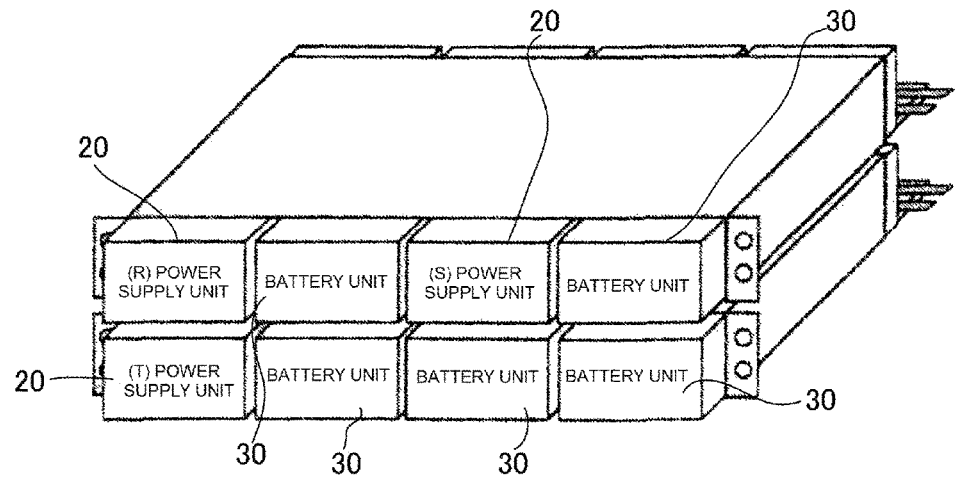
FIG. 5A and 5B are diagrams showing an expansion example of the uninterruptible power supply system when three-phase alternating current is input.
Figure 5B:
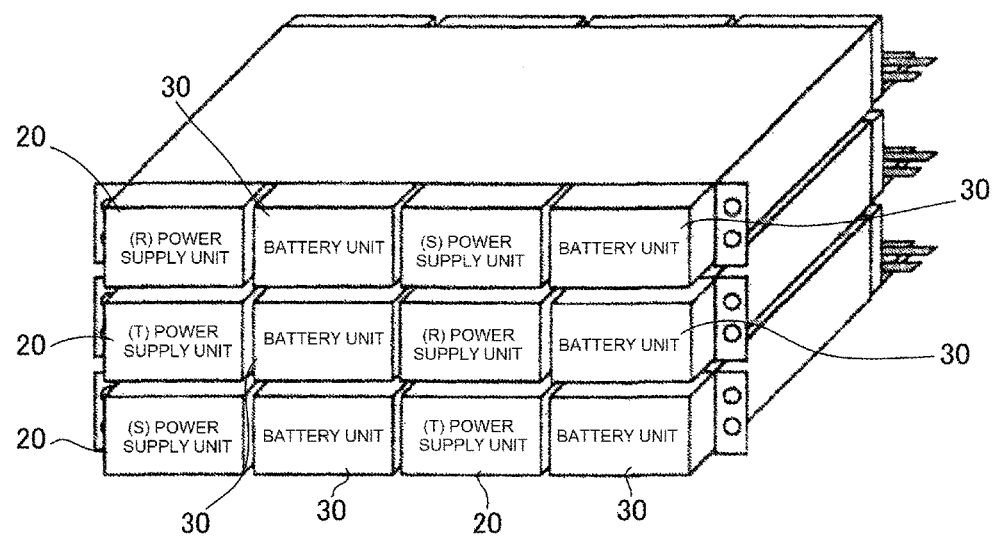

In the case of a three-phase input of the alternating current power supply, it is sufficient that battery capacity is increased by increasing the number of the battery unit 30, as shown in, for example, FIG. 5A. Furthermore, it is also of course possible to increase the power supply capacity itself with respect to the server (load apparatus) 4 by increasing the number of each of the power supply unit 20 and battery unit 30, as shown in, for example, FIG. 5B. In this case, it is desirable that the power supply unit 20 and battery unit 30 are housed aligned on each of three vertically aligned housing shelves.

That is, the power supply unit 20 and battery unit 30 in the uninterruptible power supply system 10 are of the same size, and are configured individually. Consequently, the number of the power supply unit 20 and battery unit 30 can be increased as appropriate in accordance with the power capacity required of the uninterruptible power supply system 10, and in accordance with the time of the back-up by the battery unit 30 when the alternating current power supply is stopped. Therefore, the uninterruptible power supply system 10 has excellent expandability, and it is thus possible to construct the power supply system 100 in conformity with various specifications.

Figure 6:
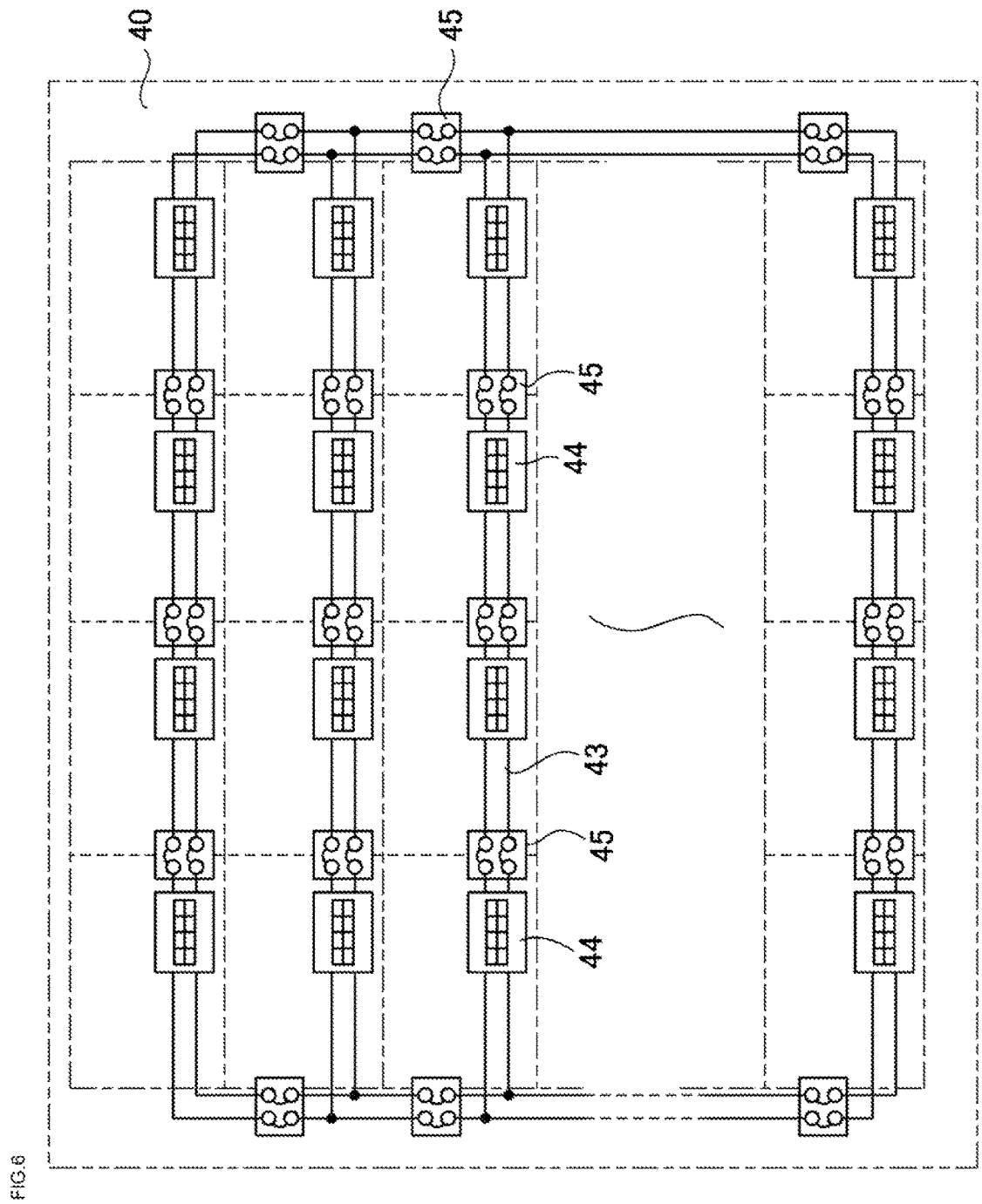
FIG. 6 is a diagram showing a schematic configuration example of a connecting structure body provided in the server rack.

Next, a description will be given of the server rack 40 in which the power supply unit 20 and battery unit 30 are housed as heretofore described. The connecting structure body 41 is provided on the back surface of the server rack 40, as previously described. FIG. 6 shows a schematic configuration example of the connecting structure body 41, wherein 44 in the drawing indicates connectors connected to the alternating current power supply line 42 and direct current power line 43. These connectors 44 are provided one for each power supply unit 20 and/or battery unit 30 housing region, which is the housing region of one shelf in the server rack 40 divided into four portions in the width direction.

Also, a plurality of terminal portions 45 separating the direct current power line 43 between neighboring housing regions are provided in the connecting structure body 41. The terminal portions 45, by unshown terminal units being mounted, perform a role of sequentially connecting the direct current power line 43 in series via the terminal units. Consequently, when the terminal units are removed, the direct current power line 43 is separated at the positions in which the terminal portions 45 are mounted. By the direct current power line 43 being separated in the terminal portions 45, the direct current power line 43 is set so as not to form a loop on the back surface side of the server rack 40. Furthermore, the direct current power lines 43 from a plurality of the uninterruptible power supply system 10 to a plurality of the server (load apparatus) 4 are each set so as to form the shortest path.

Herein, it is also possible to divide the direct current power line 43 into a plurality of systems by utilizing the terminal portions 45, and to hierarchically link a plurality of direct current power lines 43 via the terminal portions 45. According to this kind of hierarchical linking of a plurality of direct current power lines 43, it is possible, for example, to form a 24V DC direct current power line 43 from a 12V DC direct current power line 43. Consequently, even when mounting a 24V DC server (load apparatus) 4 in the server rack 40, it is possible to respond with the previously described uninterruptible power supply system 10 that outputs 12V direct current voltage.

Figure 7:
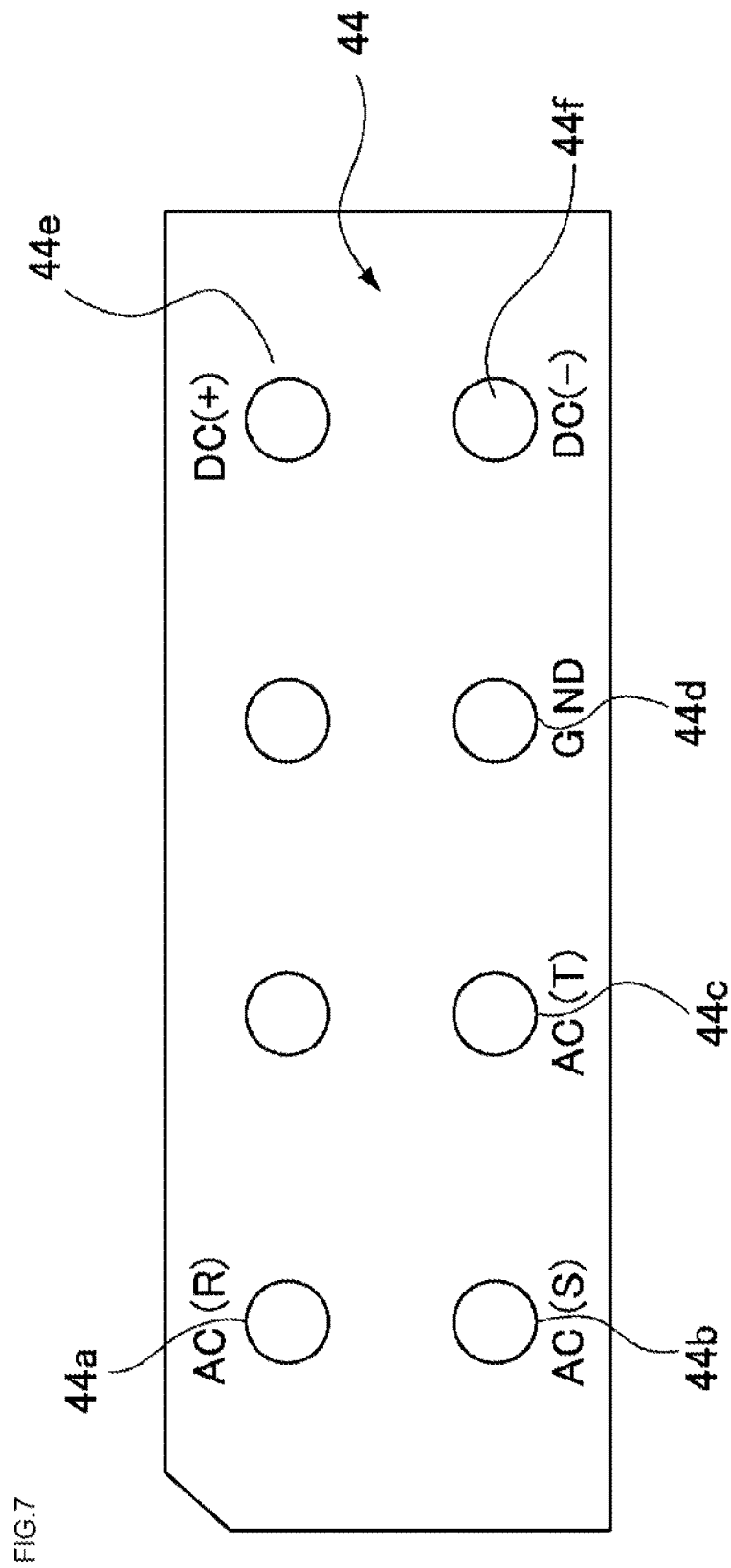
FIG. 7 is a diagram showing an example of a power supply system terminal structure of a connector.

A connector having the kind of power supply system terminal structure shown in, for example, FIG. 7 is sufficient as the connector 44. Specifically, it is sufficient that the connector is a power supply connector including three AC terminals 44a, 44b, and 44c to be connected to the alternating current power supply line 42, a GND terminal 44d to be connected to a ground line that regulates a reference potential, and a positive and negative pair of DC terminals 44e and 44f to be connected to the direct current power line 43.

Further, it is sufficient that the connection between the three AC terminals 44a, 44b, and 44c and the power supply circuit portion 21 in the power supply unit 20 can be changed depending on which phase of the S-phase, T-phase, and R-phase of the three-phase alternating current the power supply unit 20 is to be used for. Also, it is sufficient that the power supply unit 20 when single-phase alternating current is input is configured so that the power supply circuit portion 21 is connected to a predetermined two AC terminals of the three AC terminals 44a, 44b, and 44c. Furthermore, it is sufficient that the battery unit 30 is configured so as to be connected to the AC terminals 44a, 44b, and 44c in accordance with whether or not the battery circuit 31 includes the AC/DC converter 34. It goes without saying that the power supply circuit portion 21 and battery circuit portion 31 in the power supply unit 20 and battery unit 30 are each connected to the positive and negative pair of DC terminals 44e and 44f.

Also, although depending on the configuration of the uninterruptible power supply system 10, it is also useful to include, for example, a serial communication connector (not shown) as the connector 44. Further, it is also possible to configure so that information is communicated on a reciprocal basis between the power supply unit 20 configuring the uninterruptible power supply system 10 and the battery unit 30, or between the power supply unit 20 and an upstream management unit 50 (refer to FIG. 1) that manages the operation of a plurality of the uninterruptible power supply system 10, via the serial communication connector.

As heretofore described, the uninterruptible power supply system 10 according to the invention is configured by each of the power supply unit 20 and battery unit 30 being mounted in the server rack 40. Further, according to the uninterruptible power supply system 10, it is possible, by increasing the number of the power supply unit 20 and battery unit 30 as appropriate in accordance with the power supply capacity required of the uninterruptible power supply system 10, and the like, to easily expand the power supply performance (capability) of the uninterruptible power supply system 10.

Moreover, by the uninterruptible power supply system 10 being disposed in proximity to the server 4 mounted in the server rack 40, it is possible to supply power to the server 4 without needlessly pulling the direct current power line 43 around. Consequently, it is possible to sufficiently shorten the direct current power line 43 while maintaining the minimum necessary wiring length. Therefore, even when a large current of low voltage (12V DC) flows through the direct current power line 43, it is possible to sufficiently reduce loss in the direct current power line 43.

Furthermore, it is possible to reduce the wiring inductance of the direct current power line 43 commensurately with the shortness of the wiring length (laying length) of the direct current power line 43 from the uninterruptible power supply system 10 to the server 4. Consequently, even when the load power in the server 4 changes sharply, it is possible to cause the operation of the uninterruptible power supply system 10 to respond swiftly by following the change. As a result of this, it is possible to keep to a minimum fluctuation in the direct current voltage (12V DC) supplied to the server 4, and thus possible to achieve a stabilizing of the direct current voltage (12V DC).

At this time, supply of the direct current voltage (12V DC) at low loss can be realized by the power supply unit 20, which generally has a higher operating rate than the battery unit 30, being disposed in a position such that the wiring length of the direct current power line 43 with respect to the server 4 is short. In this case, it is sufficient that the positions in which the direct current power line 43 is separated by the terminal portions 45 are set so that the wiring length of the direct current power line 43 to the server 4 is shortest.

Figure 8:
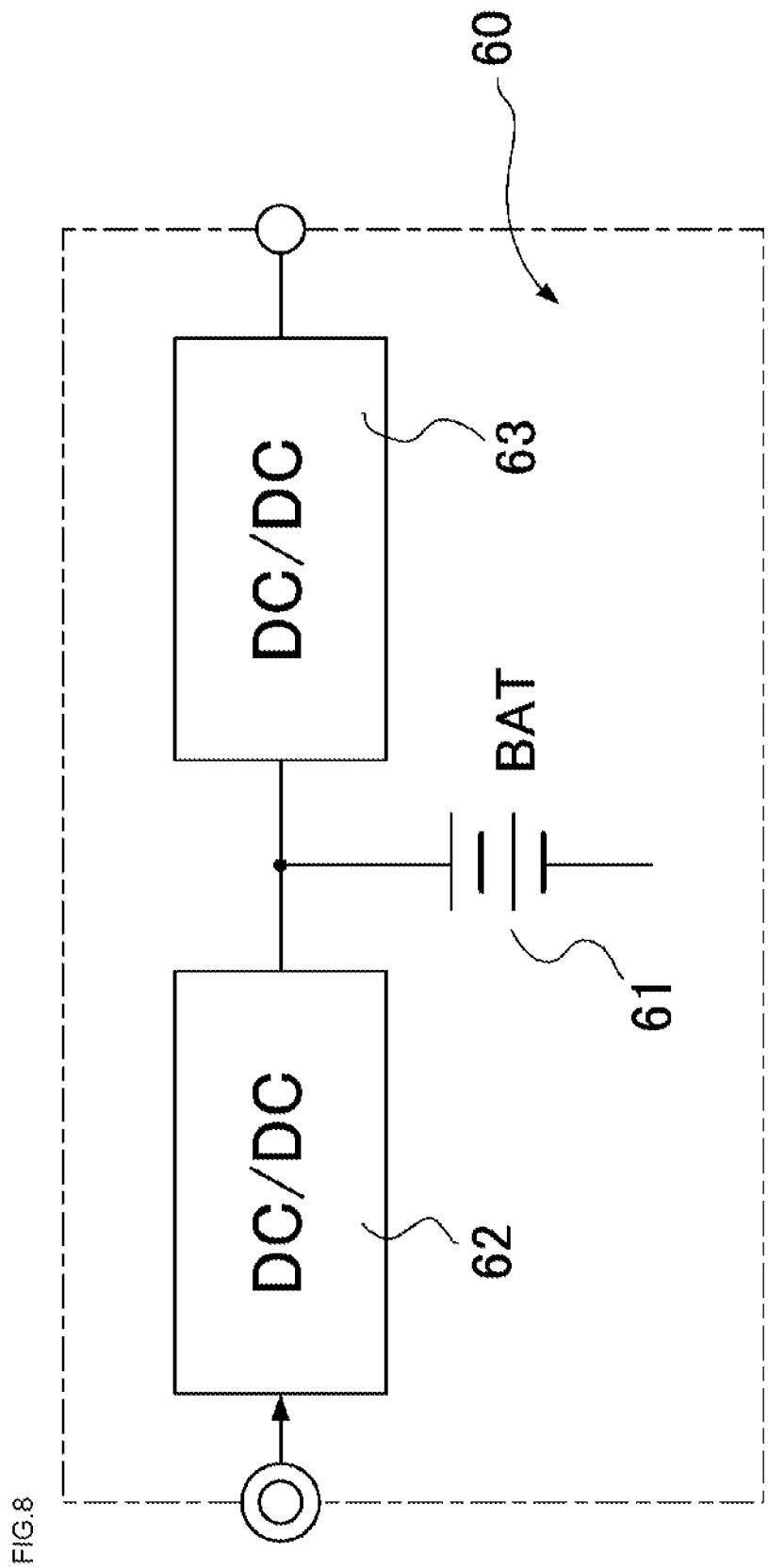
FIG. 8 is a diagram showing a configuration example of an auxiliary battery unit that stores direct current power obtained by a photovoltaic generation device.

Herein, the uninterruptible power supply system 10 configured as heretofore described is such that it is also useful to add, for example, an auxiliary battery unit 60 that stores power obtained from a photovoltaic generation device, or an auxiliary battery unit 70 that stores power obtained from a wind power generation device. Herein, as shown in, for example, FIG. 8, the auxiliary battery unit 60 includes a battery 61 formed of a Li-ion battery or the like, and a DC/DC converter 62 that converts the voltage of direct current power obtained by the photovoltaic generation device, and charges the battery 61. Furthermore, the auxiliary battery unit 60 includes a DC/DC converter 63 that converts direct current power stored in the battery 61 into the direct current voltage (12V DC), and outputs the direct current voltage. Further, the auxiliary battery unit 60 is also configured housed in a frame of the same dimensions as that of the power supply unit 20.

Figure 9:
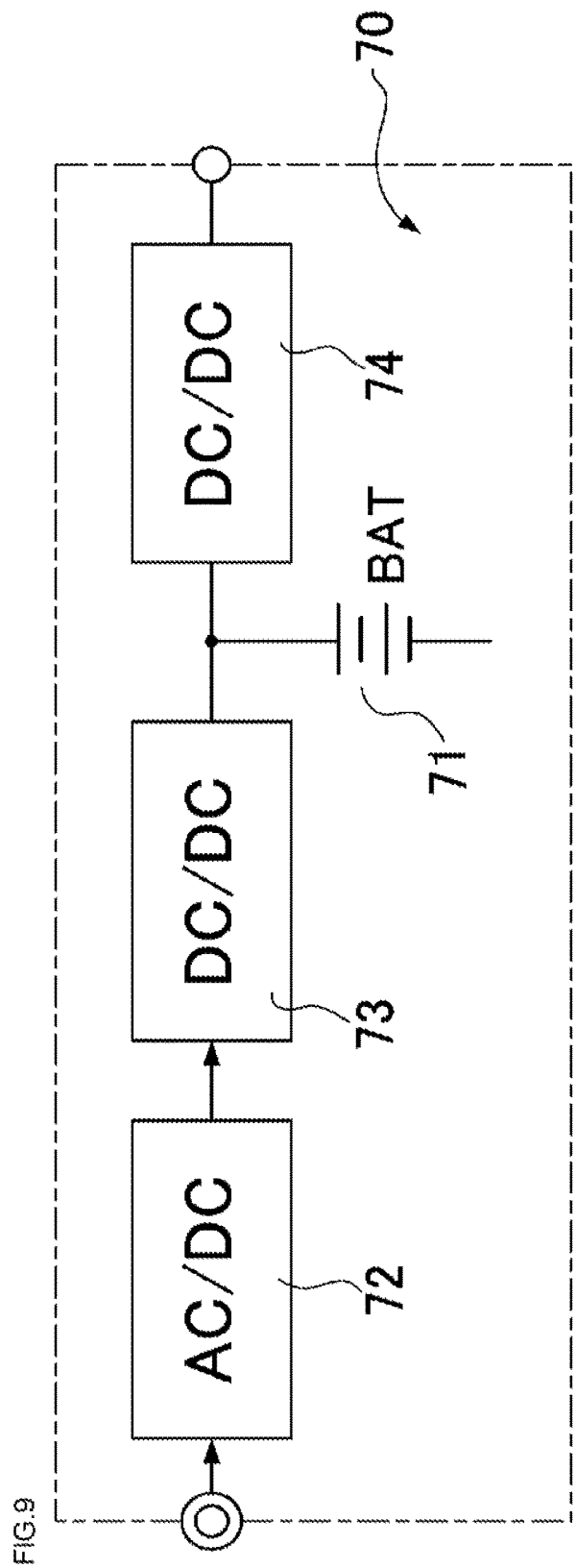
FIG. 9 is a diagram showing a configuration example of an auxiliary battery unit that stores direct current power obtained by a wind power generation device.

Also, as shown in, for example, FIG. 9, the auxiliary battery unit 70 includes a battery 71 formed of a Li-ion battery or the like, an AC/DC converter 72 that converts the alternating current voltage obtained by the wind power generation device, and a DC/DC converter 73 that converts the output voltage of the AC/DC converter 72, and charges the battery 71. Furthermore, the auxiliary battery unit 70 includes a DC/DC converter 74 that converts direct current power stored in the battery 71 into the direct current voltage (12V DC), and outputs the direct current voltage. Further, the auxiliary battery unit 70 is also configured housed in a frame of the same dimensions as that of the power supply unit 20.

It is desirable that power supply lines from the photovoltaic generation device and wind power generation device to the auxiliary battery units 60 and 70 are configured, for example, so as to directly supply power to the auxiliary battery units 60 and 70, so as to differ clearly from the alternating current power supply line 42. Specifically, when mounting the auxiliary battery units 60 and 70 in the server rack 40, it is sufficient to configure so as to supply power from the surface (front surface) sides of the auxiliary battery units 60 and 70. At this time, provided that connection connector (terminal) structures for the power supply lines from the photovoltaic generation device and wind power generation device differ from each other, it is possible to easily prevent connection errors.

Figure 10:
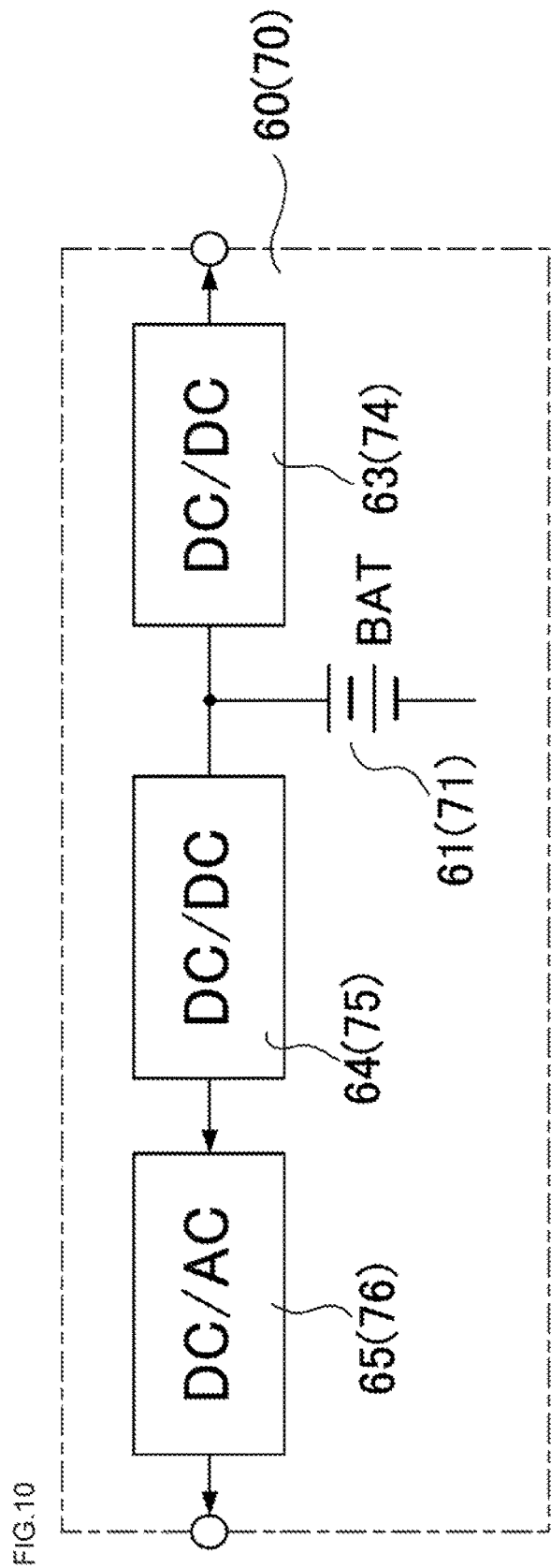
FIG. 10 is a diagram showing a configuration example of an alternating current power output circuit provided in an auxiliary battery unit.

Further still, as shown in, for example, FIG. 10, a DC/DC converter 64 (75) that converts the voltage of direct current power stored in the battery 61 (71), and extracts the voltage, and a DC/AC converter 65 (76) that generates the alternating current power (200V AC) from the output of the DC/DC converter 64 (75), are provided in the auxiliary battery units 60 and 70. Further, it is also useful to configure so that the output (200V AC) of the DC/AC converter 65 (76) can be supplied to the alternating current power supply line 42.

By adding the auxiliary battery units 60 and 70 with the heretofore described configurations to the uninterruptible power supply system 10, it is possible to effectively back up the battery unit 30, and by extension the power supply performance of the power supply unit 20, with the direct current power stored in each of the batteries 61 and 71 of the auxiliary battery units 60 and 70. In addition to this, for example, it is possible to supplement one portion of the direct current power (12V DC) supplied from the power supply unit 20 to the server 4 with power that can be output from the auxiliary battery units 60 and 70. Consequently, it is possible to lighten the burden exerted on the power supply unit 20.

Furthermore, it is possible to supplement one portion of the alternating current power (200V AC) supplied to the alternating current power supply line 42 with power that can be output from the auxiliary battery units 60 and 70. Therefore, it is also possible to suppress power consumption in the power supply unit 20 with respect to the high-voltage alternating current power (200V/400V AC) supplied from the system power supply. Consequently, in addition to the heretofore described effect of lightening the processing burden in the power supply unit 20, it is possible to achieve an increase in power saving in the uninterruptible power supply system 10.

At this point, a description will be given of control units 26 and 36, mounted in the power supply unit 20 and battery unit 30 respectively, and of control functions thereof. The control units 26 and 36 basically perform a role of controlling the operations of the power supply circuit portion 21 and battery circuit portion 31. Also, the control units 26 and 36 also include a function of controlling fan drive units 27 and 37 respectively, thereby controlling the rotation speed (air flow) of fan devices 28 and 38 provided in the frames of the power supply unit 20 and battery unit 30 respectively.

Herein, the fan devices 28 and 38 cause air to flow through the interior of each frame, thereby releasing heat generated by the power supply circuit portion 21 and battery circuit portion 31 to the exterior of the frame. Further, the fan devices 28 and 38 perform a role of preventing overheat (an increase in temperature) of the power supply circuit portion 21 and battery circuit portion 31 by the heat release. The fan devices 28 and 38, generally being provided in a back portion of the frame, release the heat in the frame interior by blowing air toward the back surface side of the server rack 40.

Figure 11:
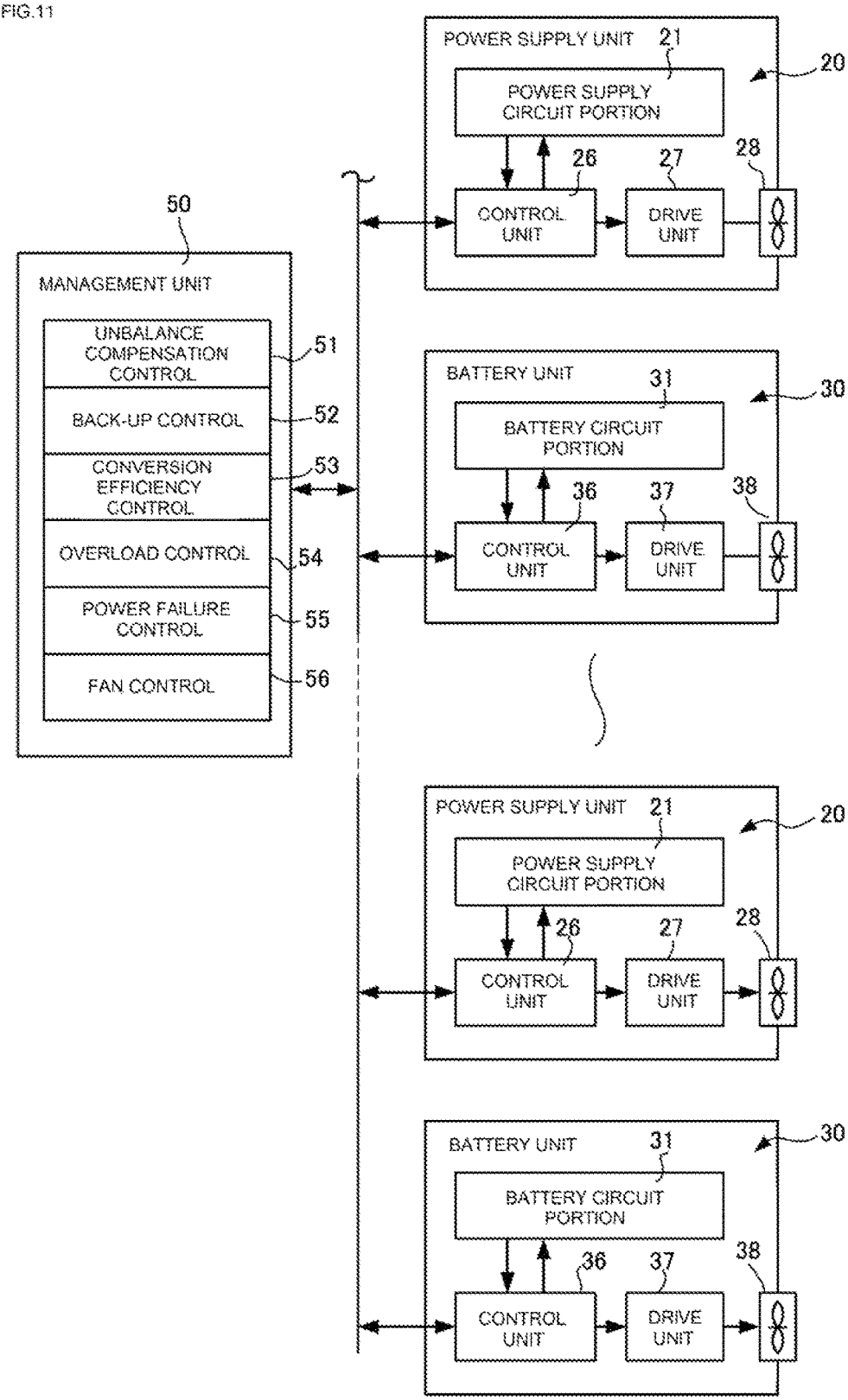
FIG. 11 is a diagram showing a configuration example of fan devices provided in each of a power supply unit and a battery unit, and of a management unit.

The management unit 50 performs a role of controlling each operation of the power supply unit 20 and battery unit 30 by correlating the operations with each other, as shown by schematically showing the control functions of the management unit 50 in FIG. 11. Specifically, the management unit 50 is configured based on, for example, a microprocessor. Further, the management unit 50 includes, for example, an unbalance compensation control function 51, a back-up control function 52, a conversion efficiency control function 53, an overload control function 54, a power failure control function 55, and a fan control function 56, as control programs executed by the microprocessor. The control functions 51 to 56 of the management unit 50 are such that each function is executed while monitoring the operating state of the units 20 and 30 based on communication of information with the power supply unit 20 and battery unit 30.

Specifically, the unbalance compensation control function 51 monitors unbalance among the R-phase, S-phase, and T-phase based on the amount of power in the R-phase, S-phase, and T-phase in the three-phase alternating current input uninterruptible power supply system 10. Further, the unbalance compensation control function 51 controls the amount of power output from the power supply unit 20 of each phase utilizing the charge/discharge power of the battery 32 in the battery unit 30 of each phase, thereby compensating for unbalance among the phases.

Also, the back-up control function 52, in outline, is activated when the operating state (output current) of the power supply unit 20 is equal to or less than the rated power of the power supply unit 20, and the state of power storage (charging capacity) in the battery unit 30 does not reach a full charge. In this case, the back-up control function 52, for example, calculates the difference between the rated current of the power supply unit 20 and the amount of output current from the power supply unit 20 as an amount of surplus current that the power supply unit 20 can further output, that is, as a surplus power amount. Further, the back-up control function 52, utilizing the surplus power, charges the battery 32 of the battery unit 30, thereby storing direct current power in the battery 32. The charging of the battery 32 is executed until the battery 32 is fully charged. This charging control is particularly effective when electrical energy from the photovoltaic generation device or wind power generation device cannot be obtained.

Also, the conversion efficiency control function 53 performs a role of controlling the charging and discharging of the battery 32, thereby increasing conversion efficiency in the power supply unit 20. This conversion efficiency control, for example, is executed by calculating from the amount of current output from the power supply unit 20 the ratio with respect to a maximum load thereof (load ratio; X % of load). Further, the conversion efficiency control function 53 calculates the difference between the load ratio, calculated in advance, at which maximum conversion efficiency of the power supply unit 20 is obtained (for example, when the ratio is 30% of load) and the load ratio (X % of load) calculated from the amount of current output. Further, the conversion efficiency control function 53 controls the charging or discharging of the battery unit 30 by the heretofore described difference so that the load ratio of the power supply unit 20 is 30% of load, thereby regulating the amount of current output by the power supply unit 20.

Specifically, when the amount of load current required of the power supply unit 20 corresponds to, for example, 50% of load, current equivalent to 20% of load, which is the difference with the 30% of load, is supplied from the battery unit 30. Further, by arranging so that only current equivalent to 30% of load is output from the power supply unit 20, the operation of the power supply unit 20 is in a state at 30% of load. Conversely, when the amount of load current required of the power supply unit 20 corresponds to 25% of load, current equivalent to 5% of load, which is the difference with the 30% of load, is extracted as excess from the power supply unit 20. Further, by the current equivalent to 5% of load being used for charging the battery unit 30, the operation of the power supply unit 20 is in a state at 30% of load. Owing to this kind of control of the charging and discharging of the battery unit 30, the operation of the power supply unit 20 is in a state at 30% of load, increasing conversion efficiency η of the power supply unit 20, and thus increasing the efficiency of the whole of the uninterruptible power supply system 10.

Also, the overload control function 54 performs a role of suppressing an overload operation of the power supply unit 20 when the load of the server 4 temporarily becomes heavy and the load current output from the power supply unit 20 exceeds the rated current thereof. The overload control function 54 is executed when the amount of load current supplied to the server 4 side exceeds the rated current of the power supply unit 20. Further, the overload control function 54 calculates the difference between the load current and rated current as the amount of current lacking for the server 4, and controls the operation of the battery unit 30 so that current corresponding to the amount of current lacking is obtained from the battery unit 30.

As a result of this, the current output from the power supply unit 20 and the current output from the battery unit 30 are supplied together to the server 4. As a result of this, it is possible to keep the current output from the power supply unit 20 (the amount of load current) at the rated current of the power supply unit 20. In other words, the amount of the amount of load current required of the power supply unit 20 exceeding the rated current thereof is compensated for by current from the battery unit 30. Because of this, it is possible to forestall a failure wherein an excess load exceeding the rated capability of the power supply unit 20 is applied to the power supply unit 20.

When controlling the operations of a plurality of the uninterruptible power supply system 10 in parallel under the management of the management unit 50, the power failure control function 55 is executed when the supply of high-voltage alternating current power (400V AC) from the system power supply is interrupted. Specifically, when there is a power failure, each uninterruptible power supply system 10 basically switches the power supply to the server 4 assigned thereto to a power supply from the battery unit 30. At this time, based on the amount of power stored in the battery unit 30 of each of the plurality of uninterruptible power supply systems 10 and the amount of current to be supplied to the server 4, the power failure control function 55 calculates the possible back-up time for which power can be supplied from each battery unit 30 to the server 4.

Further, when an uninterruptible power supply system 10 with no leeway in the possible back-up time exists, one portion of the load of the server 4 assigned to the relevant uninterruptible power supply system 10 is shifted to another server 4, whereby the load of the assigned server 4 is lightened. That is, a division of load to the plurality of uninterruptible power supply systems 10 is executed, thereby reducing the load of the uninterruptible power supply system 10 for which the amount of power stored in the battery unit 30 is small, and back-up capability is insufficient.

According to this kind of load division control, even when the load exerted on the server 4 increases sharply, or even when a power failure occurs, it is possible to reduce the load of the server 4 connected to the relevant uninterruptible power supply system 10 before the remaining capacity of the battery 32 reaches zero (0). Consequently, it is possible to forestall an excess load exceeding the rated capability of the power supply unit 20 being applied to the power supply unit 20 of the uninterruptible power supply system 10, and thus possible to guarantee stable operation of the power supply unit 20. Furthermore, it is possible to forestall the kind of failure wherein only the server 4 connected to a specific uninterruptible power supply system 10 stops operating earlier.

Also, when employing the previously described configuration including the auxiliary battery units 60 and 70, wherein alternating current voltage (200V AC/400V AC) is output from the auxiliary battery units 60 and 70 to the alternating current power supply line 42, a shift to a complete power failure mode of the power supply unit 20 can be prevented in the following way. That is, when it is possible to a certain extent to secure the power necessary for the operation of the uninterruptible power supply system 10 from the alternating current power supply line 42, even when the alternating current voltage (400V AC/200V AC) drops, direct current power stored in the auxiliary battery units 60 and 70 is converted into alternating current voltage, and output to the alternating current voltage (200V AC/400V AC) supply line.

Therefore, the drop in the alternating current voltage (400V AC/200V AC) can be compensated for with the power output from the auxiliary battery units 60 and 70, and it is thus possible to forestall a shift to the complete power failure mode of the power supply unit 20. This control is executed under, for example, the power failure control function 55.

Meanwhile, the fan control function 56 performs a role of driving the fan devices 28 and 38, even when the power supply unit 20 and/or battery unit 30 has stopped operating. Herein, the fan devices 28 and 38 form an air flow inside the frames in which the power supply unit 20 and battery unit 30 are housed, expelling heat generated inside the frames to the exterior. Also, at the same time, the fan devices 28 and 38 perform a role of cooling the whole of the uninterruptible power supply system 10 by expelling heat inside the server rack 40 to the exterior.

The fan control function 56, by driving the fan devices 28 and 38 that perform this kind of role, prevents the retention of an air flow inside the server rack 40, thereby preventing a localized overheat inside the server rack 40. Also, the fan control function 56 collects not only the load status of each uninterruptible power supply system 10, but also the load status of the server 4. Further, the fan control function 56 individually controls the rotation speed of each fan device 28 and 38 in accordance with the load statuses, thereby forming a smooth air flow inside the server rack 40.

Herein, the collection of the load statuses is carried out in accordance with a communication of information with the power supply unit 20 and battery unit 30 configuring the uninterruptible power supply system 10, and furthermore, with the auxiliary battery units 60 and 70 and the server 4. At this time, it is sufficient that which housing region of the server rack 40 each of the units 20, 30, 60, and 70 is mounted in is preset using, for example, a mounting position identification DIP switch provided in each of the units 20, 30, 60, and 70.

By so doing, it is possible to determine in which site (region) inside the server rack 40 a large amount of heat is generated. Consequently, it is possible to prevent the occurrence of heat accumulation by regulating the rotation speed (air flow) of the fan devices 28 and 38 in accordance with the state of heat generation distribution, thereby changing the flow of air inside the server rack 40. Consequently, it is possible to ensure efficient operation of the whole system. Moreover, as there is no longer any need for only the fan device 28 of the power supply unit 20 to be rotationally driven at high speed, it is also possible to prevent the occurrence of noise accompanying high-speed rotation of the fan.

Also, according to the previously described configuration, it is possible to carry out a supply of power from the battery unit 30 to the server 4 when the power supply unit 20 shifts to the complete power failure mode in response to a failure of the alternating current voltage (200V AC/400V AC). Further, it is possible to cause the operation (drive) of the server 4 to continue, even at the time of power failure.

Consequently, it is possible to forcibly stop the operation of the power supply unit 20 by, for example, removing the power supply unit 20 from the server rack 40. That is, it is possible to artificially set the power supply unit 20 in a complete stop mode.

Therefore, a supply of direct current power (12V DC) is carried out to the server 4 from the battery unit 30 connected in parallel to the power supply unit 20. Consequently, by measuring the discharge characteristics of the battery 32 in the battery unit 30 at this time, specifically the change in the charge voltage of the battery 32 accompanying the elapse of time, it is possible to easily diagnose the extent of characteristic depreciation in the battery 32 from the measured discharge characteristics.

For example, the output of the power supply unit 20 is forcibly set to zero (0), or reduced, under a battery depreciation diagnosis function of the management unit 50. Further, the discharge characteristics of the battery 32 in the battery unit 30 at this time, specifically the change in the charge voltage of the battery 32 accompanying the elapse of time, are measured. Further, it is also possible to diagnose the extent of characteristic depreciation in the battery 32 from the measured discharge characteristics of the battery 32. By so doing, it is possible to carry out a depreciation diagnosis on the battery 32, without artificially cutting off the input or output of the power supply unit 20 from the server rack 40, forcibly causing a power failure state by removing the power supply unit 20, or the like.

Consequently, according to the power supply system 100 configured to include a plurality of the uninterruptible power supply system 10, it is possible to easily execute a depreciation diagnosis on the battery 32 included in the battery unit 30 with the power supply system 100 still in an operational state, without artificially causing a failure of the alternating current voltage (200V AC/400V AC). In particular, it is possible to individually implement a depreciation diagnosis on the battery 32 in each battery unit 30 in the plurality of uninterruptible power supply systems 10. Consequently, as there is no need to artificially cause a failure of the alternating current voltage (200V AC/400V AC) when operating the power supply system 100, advantages are achieved in that it is possible to implement maintenance of the power supply system 100 easily and efficiently, and moreover, safely, and the like.

Figure 12:
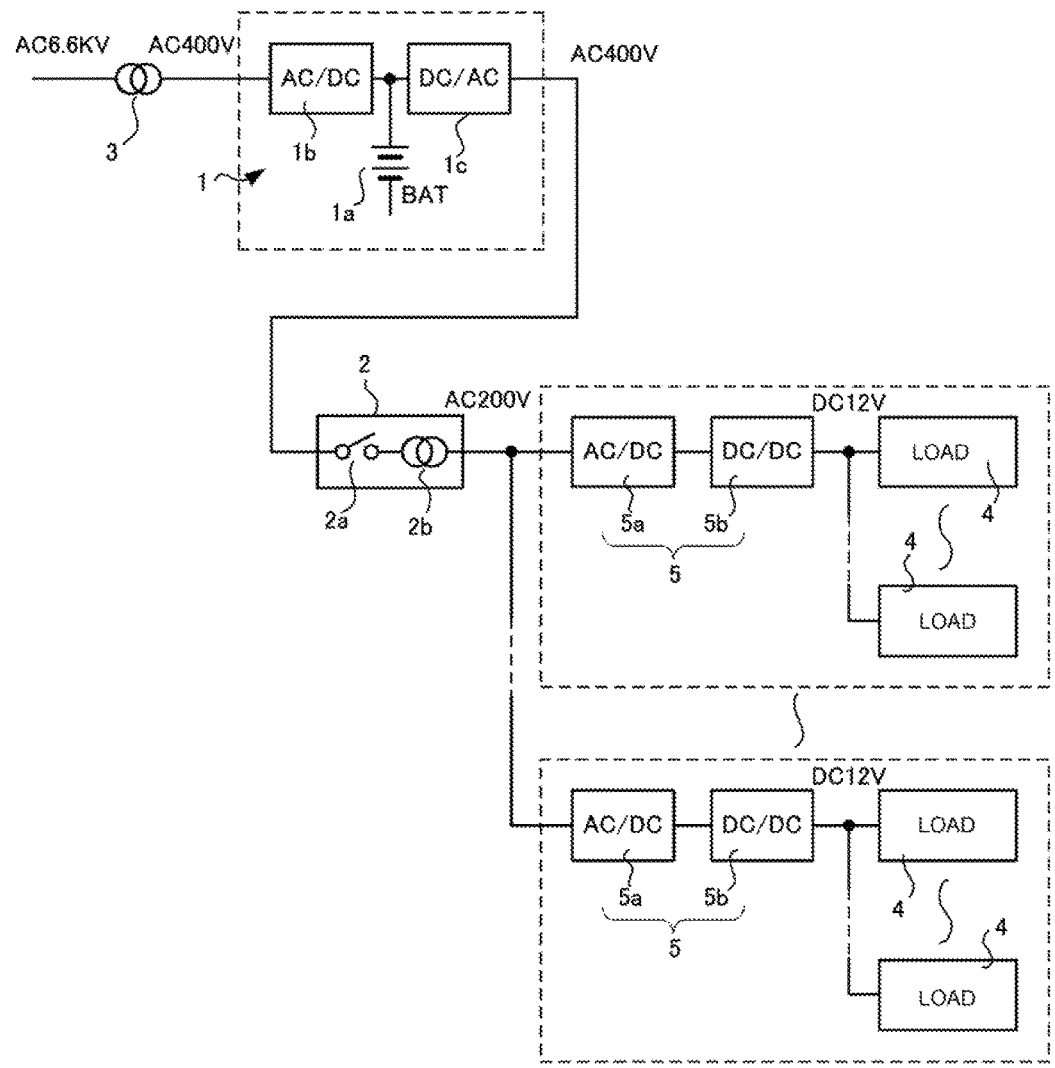
FIG. 12 is a schematic configuration diagram of an existing general power supply system in a data center including a plurality of servers.
Figure 13:
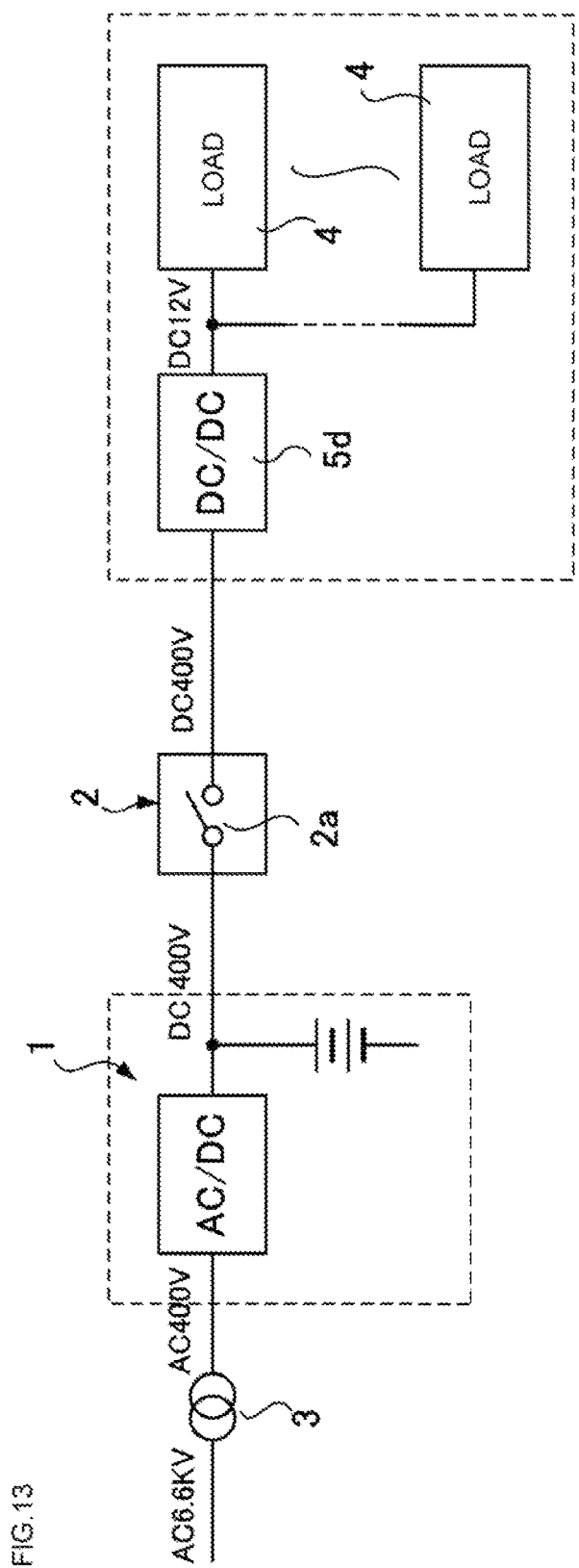
FIG. 13 is a main portion schematic configuration diagram of an existing power supply system that constructs a high-voltage direct current power supply system.
Figure 14:
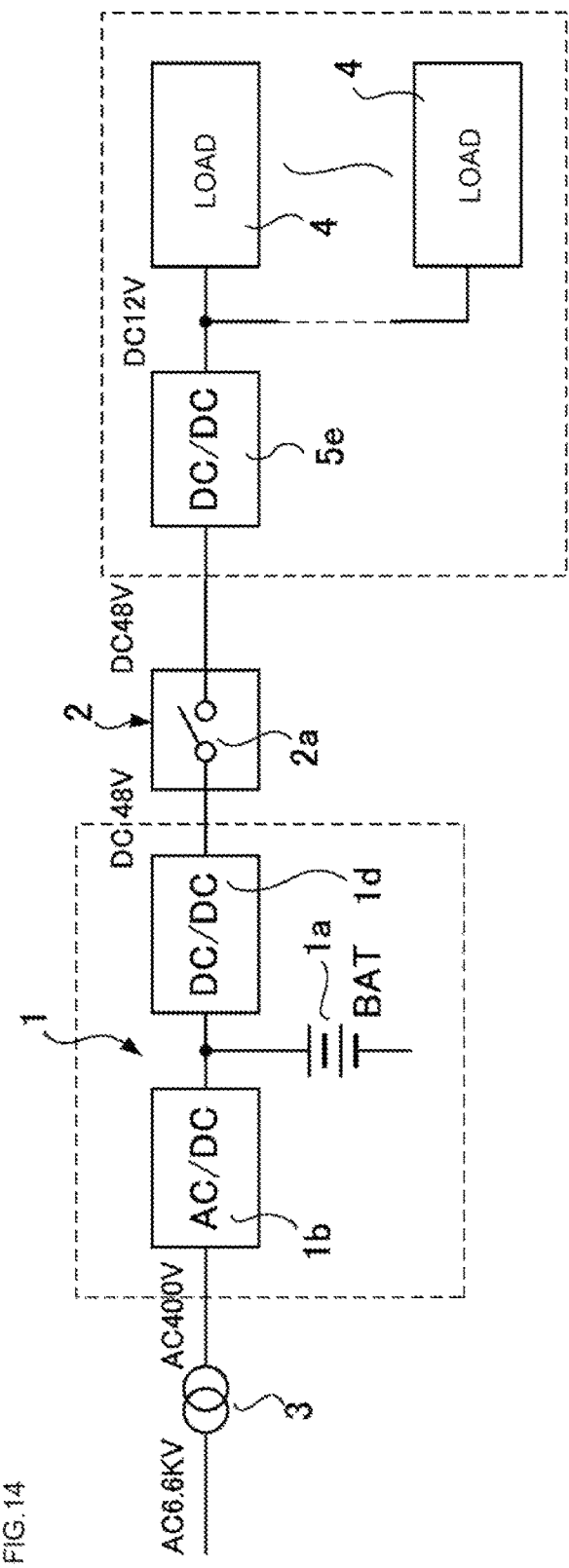
FIG. 14 is a main portion schematic configuration diagram of an existing power supply system that constructs a low-voltage direct current power supply system.

That is, in a case such as the existing general power supply system shown in FIG. 12, a power failure state occurs when a failure occurs in the battery 1a of the uninterruptible power supply system 1, or when a failure occurs in the AC/DC converter 5a or DC/DC converter 5b, or the like, in the switching power supply 5. Further, there is a risk of the power supply to the server 4 being interrupted. Regarding this point, according to the power supply system 100 configured so that a plurality of the uninterruptible power supply systems 10 provided in parallel act as power sources for each other, as shown in, for example, FIG. 4 and FIG. 11, it is possible for the uninterruptible power supply systems 10 to reduce output while mutually monitoring the situation. Also, when power cannot be supplied from the battery unit 30, it is possible to swiftly restart the power supply from the power supply unit 20. Consequently, it is possible to reliably operate the power supply system 100, without inviting the risk of the heretofore described existing power supply system.

Consequently, according to the uninterruptible power supply system 10 according to the invention, it is possible to achieve stable operation thereof, including the heretofore described ancillary control functions. Furthermore, as previously described, it is possible to easily configure the power supply system 100 with excellent expandability, and moreover, a large number of practical advantages, such as being of low cost, are achieved. Furthermore, as the power supply unit 20 and battery unit 30 can be configured housed in small frames that can be mounted in the server rack 40, handling thereof is easy, and they can be easily mounted in and removed from the server rack 40, because of which advantages such as maintenance of the power supply unit 20 and battery unit 30 being easy are also achieved.

The invention is not limited by the heretofore described embodiment. For example, it is, of course, also possible for the size of the frames of the power supply unit 20 and battery unit 30 to be realized as a one-half size, wherein one unit size (1U size) is divided in the width direction into 2 equal portions, or a one-third size, wherein one unit size is divided in the width direction into 3 equal portions. Furthermore, it goes without saying that the number of the battery unit 30 connected in parallel to the power supply unit 20 is not particularly limited either. Various other modifications are also possible, without departing from the scope of the invention.

The invention claimed is:

1. An uninterruptible power supply system, comprising:
a plurality of power supply units, each of which includes a power supply circuit converting alternating current power into direct current voltage to be supplied to a load apparatus, each said power supply unit including a frame having predetermined dimensions and housing the power supply circuit;
a plurality of battery units, each of which includes a battery circuit, at least one of the battery units being aligned with at least one of the power supply units, the battery circuit storing direct current power and discharging the direct current power to generate direct current voltage to be supplied to the load apparatus, each said battery unit including a frame having the same predetermined dimensions as that of the frame of each said power supply unit, the frame of each said battery unit housing the battery circuit; and
a rack in which each of the power supply units and the battery units is mounted so as to be connectable to the rack and detachable from the rack, the rack connecting the power supply circuit and the battery circuit in parallel, the rack including
a plurality of first connecting structure bodies, each of which extends in a first direction, each said first connecting structure body being connectably and detachably mountable to at least one of the power supply units and the battery units, and
a second connecting structure body straddling the plurality of first connecting structure bodies in a second direction different from the first direction, and being electrically connected to the first connecting structure bodies; and
a terminal unit, wherein
each said first connecting structure body includes:
a direct current power line that supplies the direct current voltages from the power supply units and the battery units to the load apparatus;
a terminal portion that
has the terminal unit mounted thereupon, and
separates the direct current power line between neighboring ones of the housing regions; and
a linking structure that connects a separated direct current power line in series via the terminal unit.

2. An uninterruptible power supply system, comprising:
a plurality of power supply units, each of which includes a power supply circuit converting alternating current power into direct current voltage to be supplied to a load apparatus, each said power supply unit including a frame having predetermined dimensions and housing the power supply circuit;

a plurality of battery units, each of which includes a battery circuit, at least one of the battery units being aligned with at least one of the power supply units, the battery circuit storing direct current power and discharging the direct current power to generate direct current voltage to be supplied to the load apparatus, each said battery unit including a frame having the same predetermined dimensions as that of the frame of each said power supply unit, the frame of each said battery unit housing the battery circuit; and a rack in which each of the power supply units and the battery units is mounted so as to be connectable to the rack and detachable from the rack, the rack connecting the power supply circuit and the battery circuit in parallel, the rack including a plurality of first connecting structure bodies, each of which extends in a first direction, each said first connecting structure body being connectably and detachably mountable to at least one of the power supply units and the battery units, and a second connecting structure body straddling the plurality of first connecting structure bodies in a second direction different from the first direction, and being electrically connected to the first connecting structure bodies; and an auxiliary battery unit including an auxiliary battery storing direct current power, and a DC/AC converter that generates alternating current power to be supplied to the power supply units from the direct current power stored in the auxiliary battery, and outputs the alternating current power to the alternating current power supply line.

3. The uninterruptible power supply system according to claim 1, wherein the rack has dimensions compliant with Electronic Industries Alliance standards such that a plurality of load apparatuses are mountable in the rack to be aligned vertically, and each frame of each said power supply unit and each said battery unit having a basic housing size of the rack, or a size such that the basic housing size is divided in a width direction into N equal portions, where N is a positive integer of 2 or more, each said frame being mounted in the rack together with the load apparatus that receives the direct current voltages from the power supply units and the battery units.

4. The uninterruptible power supply system according to claim 1, wherein the power supply units include three power supply units that are connected to a three-phase alternating current power supply so that each phase is connected to a different one of the three power supply units.

5. The uninterruptible power supply system according to claim 1, wherein two of the battery units are provided in parallel with one of the power supply units.

6. The uninterruptible power supply system according to claim 1, wherein each of the power supply units and the battery units includes a fan device, the fan devices causing air to flow through interiors of each frame of each said battery unit and each said power supply unit, thereby releasing heat in the power supply circuit and the battery circuit, and the fan devices being controlled so as to be driven even when operation of the power supply circuit and the battery circuit is stopped.

7. An uninterruptible power supply system, comprising:

a plurality of power supply units, each of which includes a power supply circuit converting alternating current power into direct current voltage to be supplied to a load apparatus;

a plurality of battery units, each of which includes a battery circuit, each said battery unit being aligned with one of the power supply units, the battery circuit storing direct current power and discharging the direct current power to generate direct current voltage to be supplied to the load apparatus; and a rack, in which each of the power supply units and the battery units is mounted so as to be connectable to the rack and detachable from the rack, the rack connecting an output of the power supply circuit to an input of the battery circuit so that the battery circuit receives the direct current voltage from the power supply circuit, the rack including a plurality of first connecting structure bodies, each of which extends in a first direction, each said first connecting structure body being connectably and detachably mountable to at least one of the power supply units and the battery units, and a second connecting structure body straddling the plurality of first connecting structure bodies in a second direction different from the first direction, and being electrically connected to the first connecting structure bodies; and a terminal unit, wherein each said first connecting structure body includes:

a direct current power line that supplies the direct current voltages from corresponding one or more of the power supply units and/or one or more of the battery units to the load apparatus;

a terminal portion that has the terminal unit mounted thereupon, and separates the direct current power line between neighboring ones of the housing regions; and a linking structure that connects a separated direct current power line in series via the terminal unit.

8. The uninterruptible power supply system according to claim 7, wherein each said power supply unit includes a frame having predetermined dimensions and housing the power supply circuit, and each said battery unit includes a frame having the same predetermined dimensions as that of the frame of each said power supply unit, the frame of each said battery unit housing the battery circuit.

9. The uninterruptible power supply system according to claim 8, wherein the rack includes a front surface side and a back surface side, the uninterruptible power supply system further comprises a plurality of connectors, each frame of each said power supply unit and each said battery unit having a respective one of the connectors disposed thereon at the back surface side of the rack, and each said first connecting structure body is coupled to the power supply circuit and the battery circuit via corresponding connectors to connect the output of the power supply circuit to the input of the battery circuit.

10. The uninterruptible power supply system according to claim 9, wherein each first connecting structure body further includes an alternating current power supply line connected to a system power supply, and the direct current power line connects the output of the power supply circuit to the input of the battery circuit.

11. The uninterruptible power supply system according to claim 7, wherein the battery circuit includes a battery for storing the direct current power, and a DC/DC converter receiving the direct current voltage from the power supply units, converting the received direct current voltage into the direct current power to be stored in the battery, and generating direct current voltage to be supplied to the load apparatus from the direct current power stored in the battery.

12. An uninterruptible power supply system, comprising:

a plurality of power supply units, each of which includes a power supply circuit converting alternating current power into direct current voltage to be supplied to a load apparatus;

a plurality of battery units, each of which includes a battery circuit, the battery circuit storing direct current power and discharging the direct current power to generate direct current voltage to be supplied to the load apparatus;

a terminal unit; and a rack, in which each of the power supply units and the battery units is mounted so as to be disengagebly connected to the rack, the rack connecting an output of the power supply circuit to an input of the battery circuit so that the battery circuit receives the direct current voltage from the power supply circuit, or connecting the power supply circuit and the battery circuit in parallel, and including a plurality of first connecting structure bodies, each of which extends in a first direction, each first connecting structure body being connectably and detachably mountable to at least one of the power supply units and the battery units, and a second connecting structure body straddling the plurality of first connecting structure bodies in a second direction different from the first direction, and being electrically connected to the first connecting structure bodies, wherein each said first connecting structure body includes:

a direct current power line that supplies the direct current voltages from corresponding one or more of the power supply units and/or one or more of the battery units to the load apparatus;

a terminal portion that
has the terminal unit mounted thereupon, and
separates the direct current power line between neighboring ones of the housing regions; and a linking structure that connects a separated direct current power line in series via the terminal unit.

* * * * *